Aug. 23, 1960     J. R. THORSON ET AL     2,950,070
CAPACITOR WINDER

Filed May 3, 1956     16 Sheets-Sheet 1

INVENTORS
John R. Thorson
James G. Black Jr.
Charles C. Rayburn
BY Donald P. Smith
Attorney Aug. 23, 1960 J. R. THORSON ET AL 2,950,070
CAPACITOR WINDER
Filed May 3, 1956 16 Sheets-Sheet 2

INVENTORS
John R. Thorson
James G. Black Jr.
Charles C. Rayburn
BY
Donald P. Smith
Attorney Aug. 23, 1960     J. R. THORSON ET AL     2,950,070
CAPACITOR WINDER Filed May 3, 1956     16 Sheets-Sheet 3

INVENTORS
John R. Thorson
James G. Black Jr.
BY Charles C. Rayburn

Donald P. Smith
Attorney

Aug. 23, 1960                J. R. THORSON ET AL                2,950,070
                                CAPACITOR WINDER

Filed May 3, 1956                                        16 Sheets-Sheet 7

INVENTORS
John R. Thorson
James G. Black Jr.
BY Charles C. Rayburn

Donald P. Smith
Attorney

Aug. 23, 1960 J. R. THORSON ET AL 2,950,070
CAPACITOR WINDER
Filed May 3, 1956 16 Sheets-Sheet 8
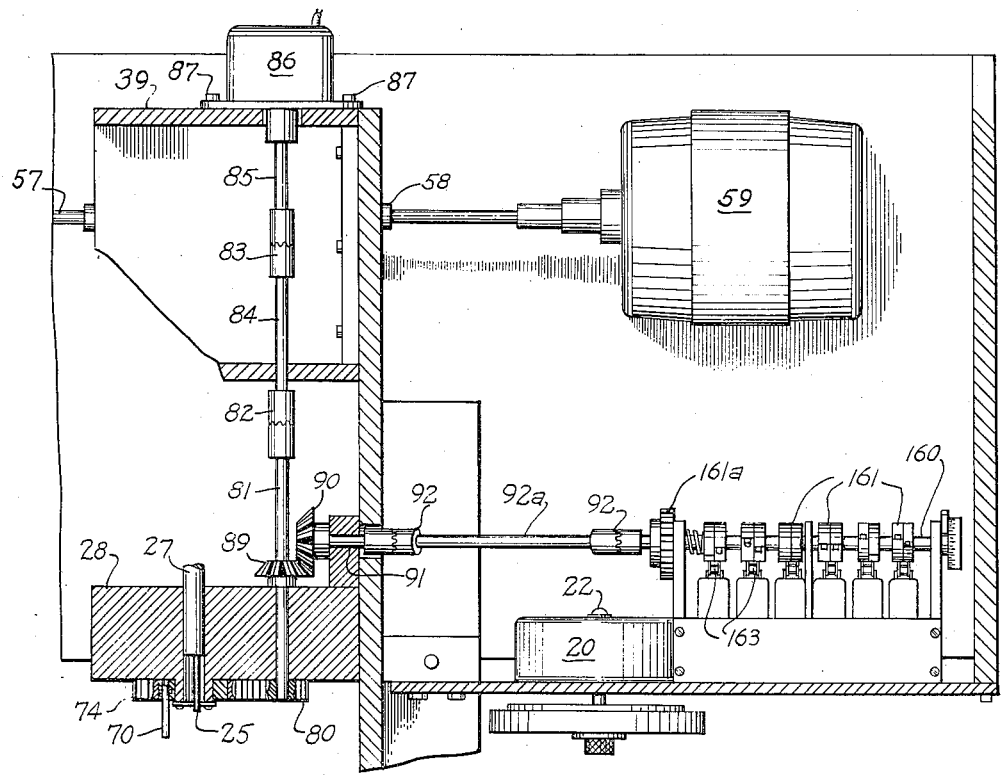
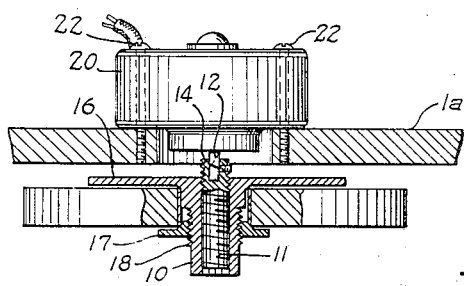
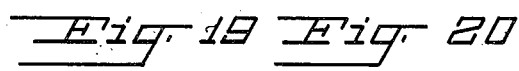
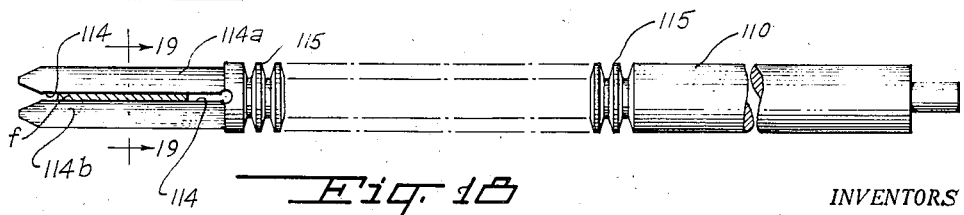
INVENTORS
John R. Thorson
James G. Black Jr.
Charles C. Rayburn
BY Donald P. Smith
Attorney INVENTORS
John R. Thorson
James G. Black Jr.
Charles C. Rayburn
BY Donald P. Smith
Attorney Aug. 23, 1960     J. R. THORSON ET AL     2,950,070
CAPACITOR WINDER Filed May 3, 1956                                        16 Sheets-Sheet 11

INVENTORS
John R. Thorson
James G. Black Jr.
Charles C. Rayburn
BY
Donald P. Smith
Attorney.

Aug. 23, 1960 J. R. THORSON ET AL 2,950,070
CAPACITOR WINDER
Filed May 3, 1956 16 Sheets-Sheet 12

INVENTORS
John R. Thorson
James G. Black Jr.
BY Charles C. Rayburn
Donald P. Smith
Attorney

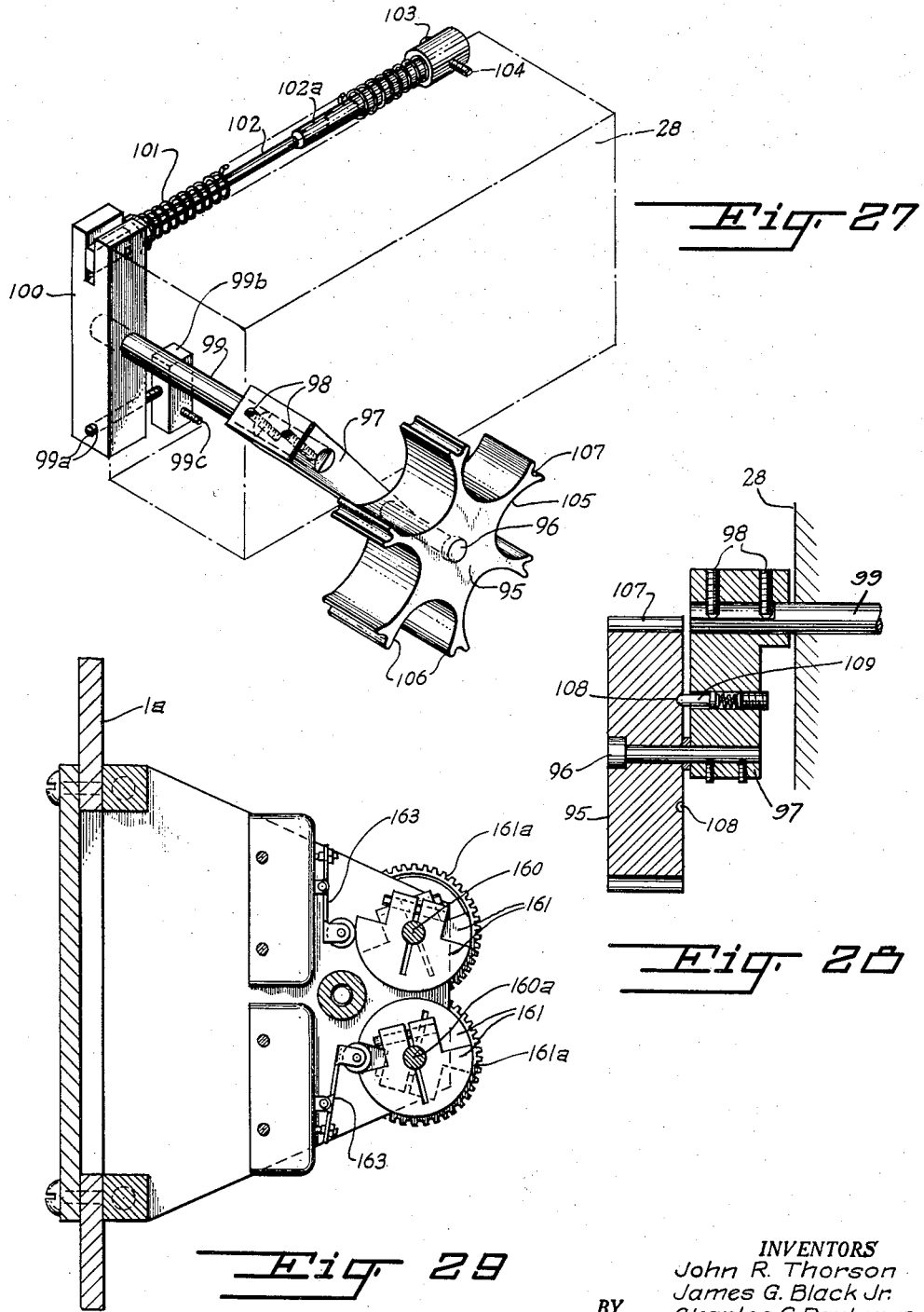

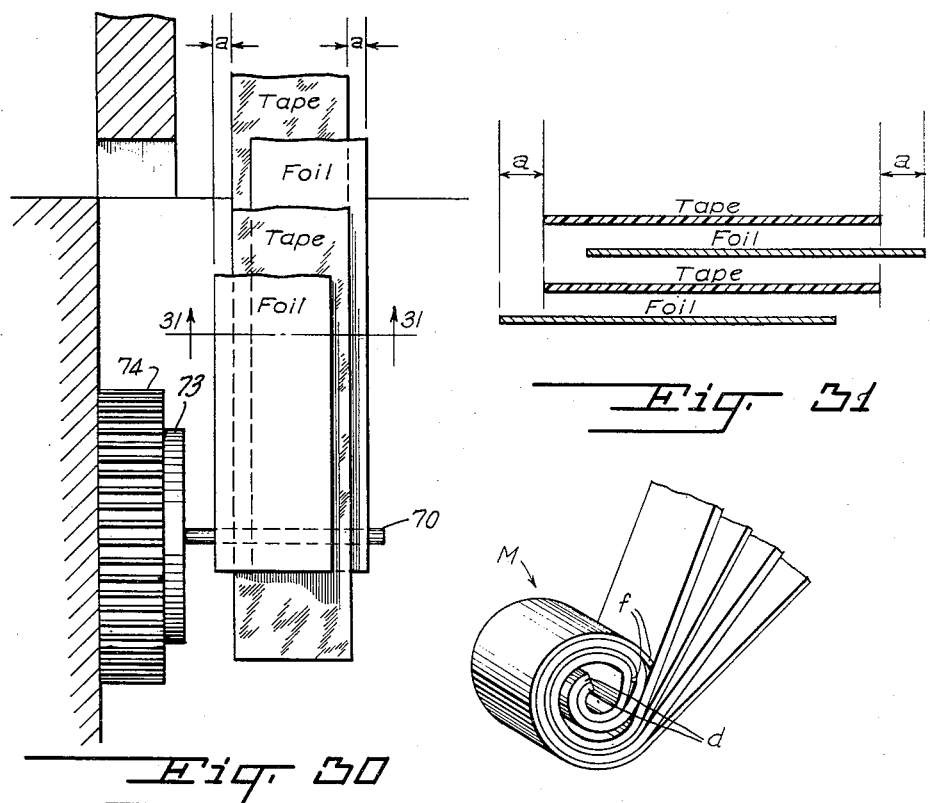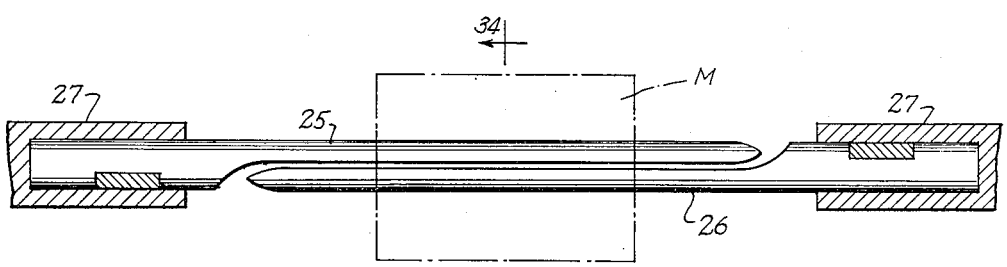

Aug. 23, 1960
J. R. THORSON ET AL
2,950,070
CAPACITOR WINDER
Filed May 3, 1956
16 Sheets-Sheet 15
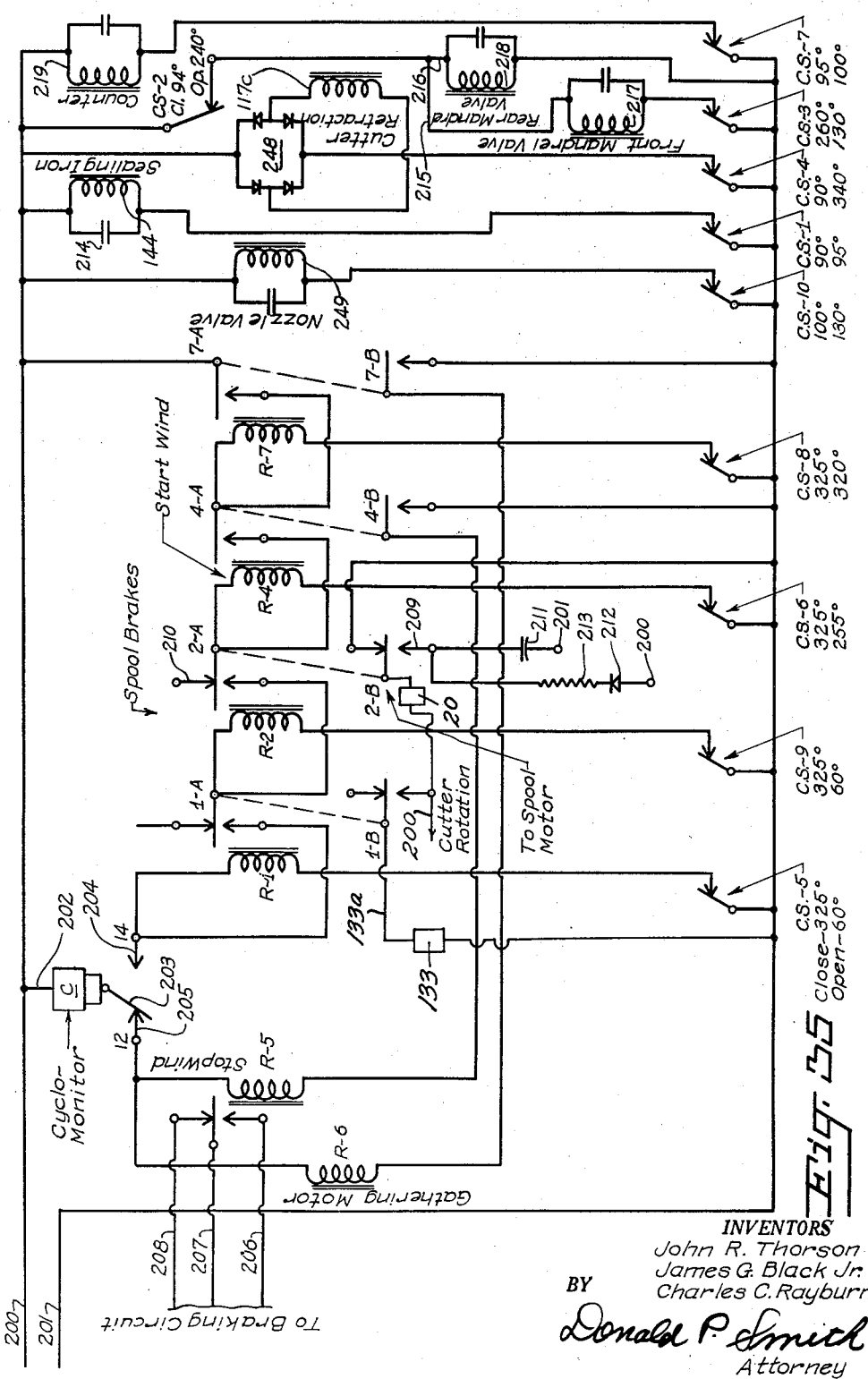
INVENTORS
John R. Thorson
James G. Black Jr.
Charles C. Rayburn
BY
Donald P. Smith
Attorney

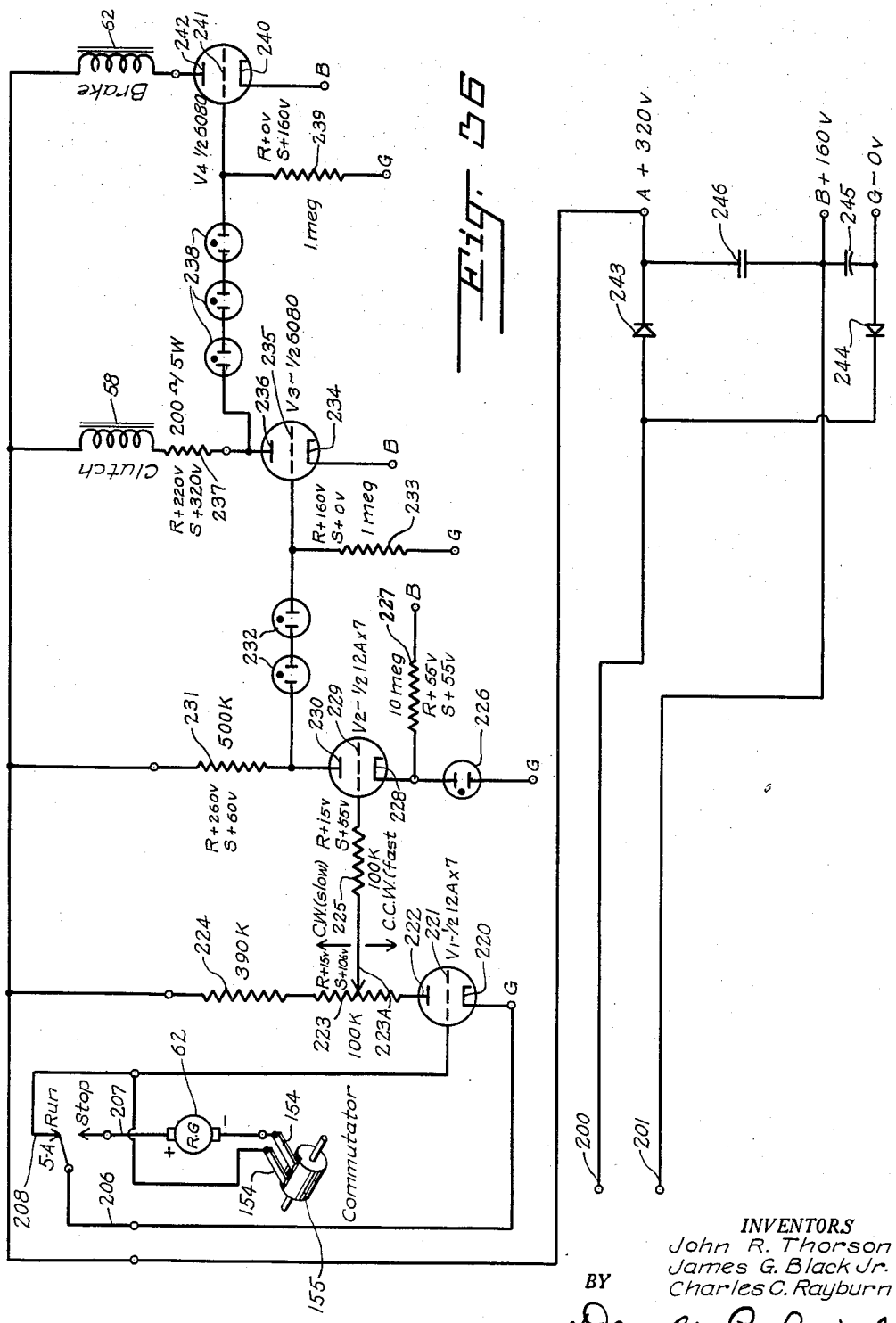

United States Patent Office 2,950,070
Patented Aug. 23, 1960

2,950,070

CAPACITOR WINDER

John R. Thorson, Alexandria, and James G. Black, Jr., and Charles C. Rayburn, Falls Church, Va., assignors, by mesne assignments, to Illinois Tool Works, Chicago, Ill., a corporation of Illinois Filed May 3, 1956, Ser. No. 582,363

22 Claims. (Cl. 242—56.1)

This invention relates to improvements in automatic machines for making cylindrical capacitors from alternate layers of foil and dielectric tape.

One of the main objects of the invention is to provide a machine which will automatically assemble capacitors from foil and dielectric tape of predetermined capacitance, the machine structure embodying means for gathering the tape and foil, winding the capacitor, severing the foil after a predetermined winding operation, sealing and severing the dielectric tape, and discharging the completed capacitor from the machine.

Another object of the invention is the provision of means for automatically cutting the metal foil to provide a measured quantity of capacitance and subsequently and sequentially simultaneously sealing and severing the tape.

Another object of the invention is to provide means for laminating the layers of foil and tape in such a manner that portions of the tape will extend beyond the capacitor body and provide material for sealing the ends of the capacitor.

A still further object of the invention is the provision of a two-piece mandrel with a novel form of gathering mechanism for associating the tape material with the two-piece mandrel for the winding operation.

It is also an object of the invention to provide for the tensioning of the foil used in the winding of the capacitor and the holding of the foil after the same is severed to insure a compact body within the confines of the associated tape.

A still further object of the invention is the provision of automatic means for sequencing the various operations including the operation of the gathering mechanism prior to the functioning of the winding and sealing means and severing means which fuses the tape on the capacitor body.

It is also a part of the present invention to control the operation of the parts and their sequence by utilizing certain of the operating means of the assembly for electronically controlling subsequent steps in the operation.

These and other objects of the invention will more clearly hereinafter appear by reference to the accompanying drawings, wherein like characters of reference designate corresponding parts throughout the several views, in which:

Fig. 9a is a detail of the gathering pin and mandrel;

Fig. 10 is a sectional view taken along line 10—10 of Fig. 8;

Fig. 12 is a sectional view of the magnetic clutch;

Fig. 13 is a sectional view of the magnetic brake;

Fig. 14 is a view partly in section showing one of the spool mountings;

Fig. 18 is a top plan view of one of the cutters;

Fig. 19 is a section taken on line 19—19 of Fig. 18 through the cutting end in normal position;

Fig. 20 is a section through the cutting end showing the cutting position;

Fig. 27 is a perspective view of the threading wheel;

Fig. 28 is a section through the threading wheel;

Fig. 29 is a sectional view on line 29—29 of Fig. 8;

Fig. 30 is a diagrammatic view showing the relative position of the mylar tape and foil during winding;

Fig. 31 is a section on line 31—31 of Fig. 30;

Fig. 32 is a perspective view illustrating the initial fold of the tape and foil;

Fig. 33 is an enlarged elevation of the mandrel sections assembled for winding;

Fig 34 is a section on line 34—34 of Fig. 33;

Fig. 35 is a diagrammatic view of the control circuits; and

Fig. 36 is a diagrammatic view of the braking and clutching circuits.

Figure 1:
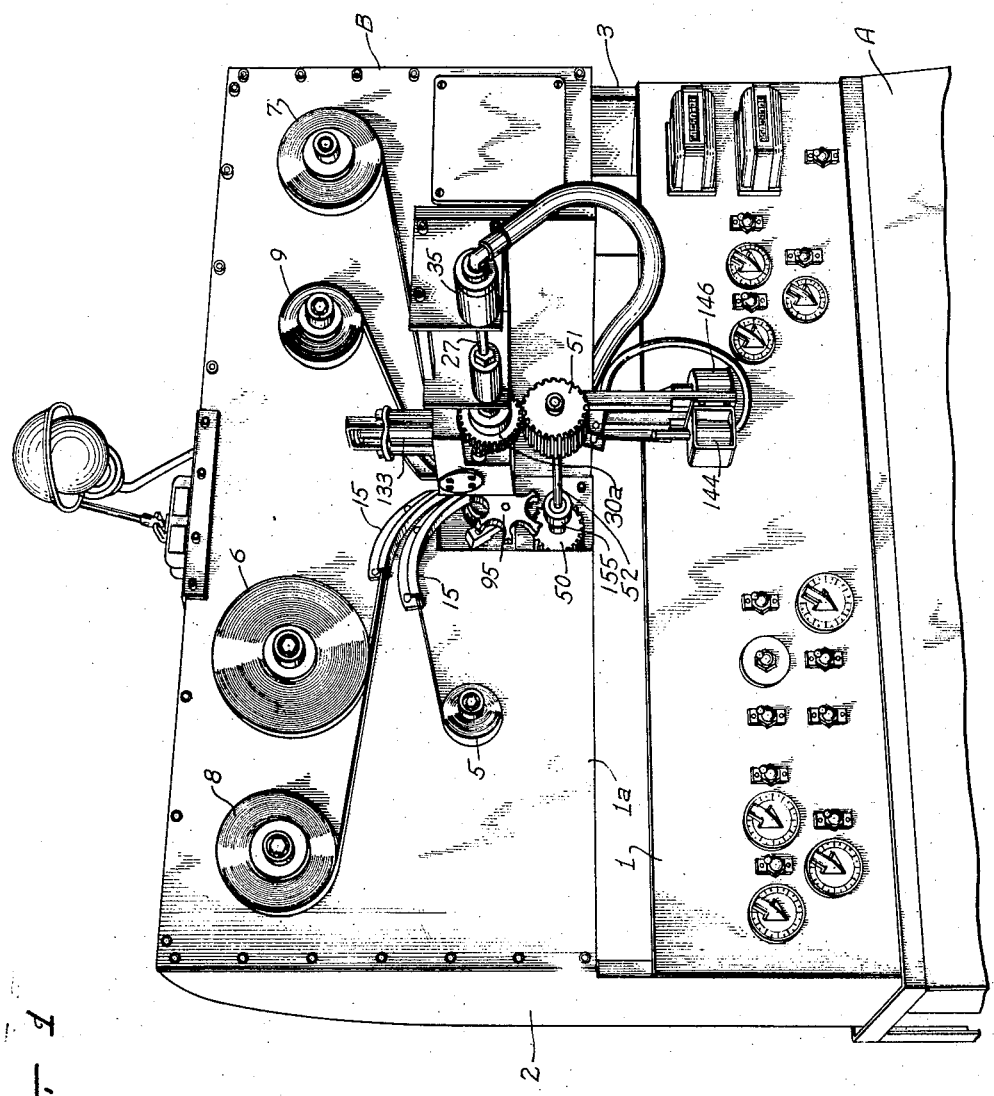
Fig. 1 is a perspective of the front of the machine.
Figure 2:
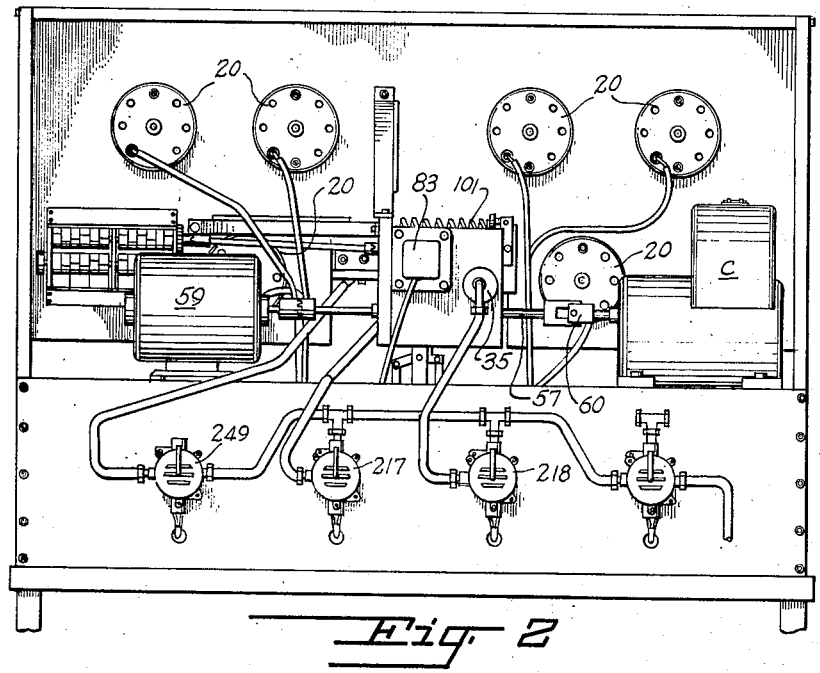
Fig. 2 is a rear elevation of the apparatus.
Figure 3:
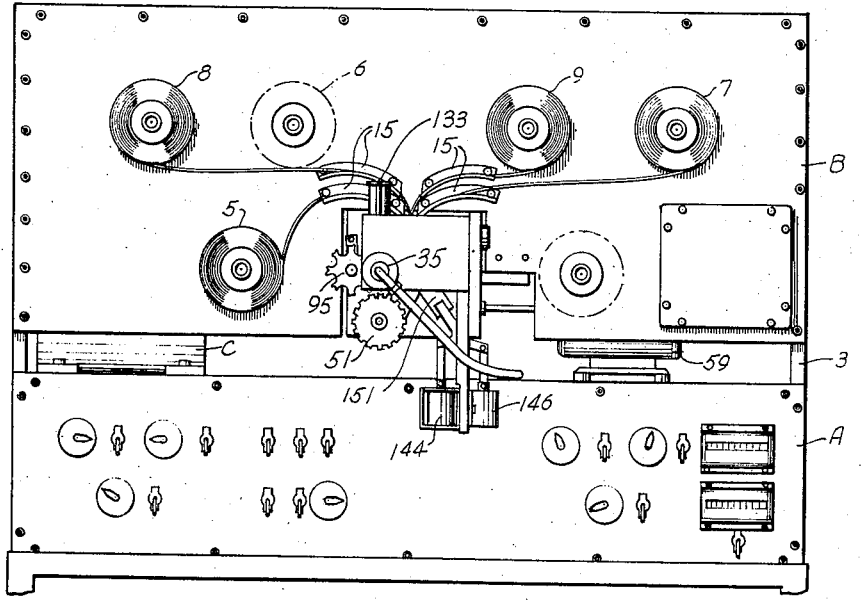
Fig. 3 is a front elevation of the apparatus.

In carrying out the present invention, the general arrangement is illustrated in Fig. 1 in which the assembly includes the base A and a supporting structure or frame assembly B, the latter being shown as including upper and lower panels 1 and 1ª for mounting the controls and the spools containing the tape and the foil. The control panel 1 is illustrated as located below the spool carrying panel 1ª and these panels are connected with side supports 2 and 3. The panel 1ª in the present disclosure is illustrated as mounting three spools of foil and two spools of suitable tape, such as Mylar tape, which has the essential dielectric characteristics to provide for the insulation of the foil when it is formed into the cylindrical capacitor. The spools containing the foil and tape are arranged alternately with the spools of foil indicated by reference characters 5, 6 and 7 and the spools of tape indicated by reference characters 8 and 9. The present spool mounting may be varied and arranged in accordance with requirements for building the capacitors of any suitable form within the scope of the invention, the present illustration being disclosed for the purpose of illustrating the associated mechanism by means of which the devices are manufactured. While three spools of foil are illustrated in Fig. 1, only two spools of foil may be used as contemplated in Figs. 30 and 31, in which an enlargement of the tape and foil is shown during the formation of the capacitor. Double dielectric can be used and any number of spools for any capacitor values may be provided.

In the present illustration each of the spools is mounted in accordance with the disclosure of Fig. 14 in which the reel 10 is mounted for axial adjustment on a threaded shaft 11 fixed on the motor shaft 12 by a set screw 14, this providing for the axial shifting of the reel with respect to the panel 1a to provide for the alignment of the tape or foil in the guide troughs 15 which are provided to control the passage of the foil and tape to the operating parts. The spools are shown as sectional and include the inner section 16 having the hub portion which is threaded on the shaft 11 and the outer flange 17 which is adjustable on the external threads 18 of the hub to clamp the spool of foil or Mylar tape so that rotation of the spool will control or be controlled by the rotation of the motor shaft 12. The motors 20 are shown secured by bolts 22 to the inner face of the panel 1a and the motors which may be of any suitable type, but which in the present instance are squirrel-cage single phase motors, are adapted to rotate their shaft 12 slowly in a direction reverse to the rotation of the spool of tape or foil, whereby the motors are not functioning as driving means but as magnetic drags opposing the free rotation of the spools carried thereby and discharging to the capacitor forming mechanism. It will be understood that the drag on the spools will be regulated by suitable rheostats so that the foil can be maintained under greater tension than the Mylar tape during the wrapping and for other purposes to be hereinafter described. It will also be understood that all of the spools carrying the tape or foil are similarly mounted and controlled to provide the required feeding of the material to the mechanism and the reversal of the foil feed as will be more fully described.

Figure 4:
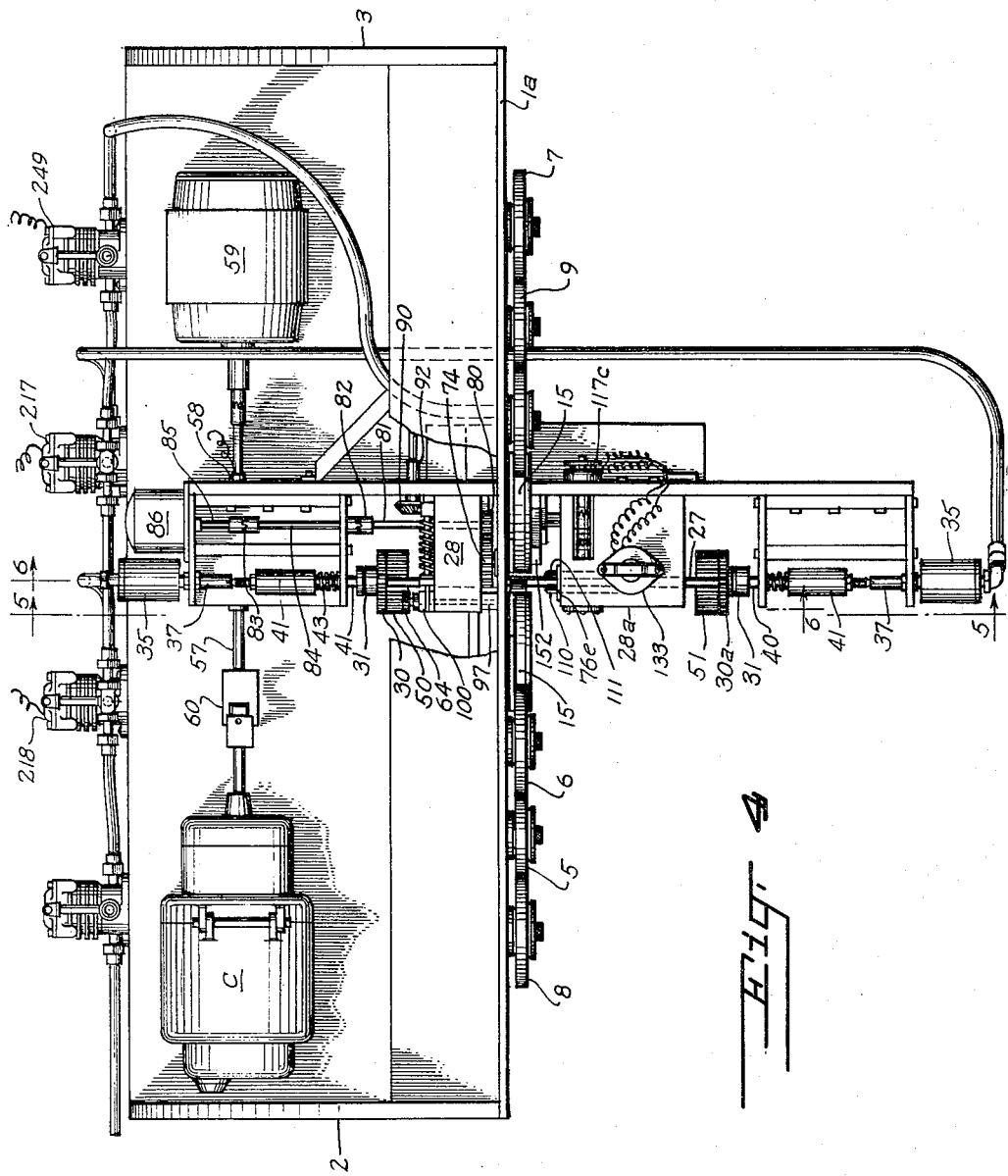
Fig. 4 is a top plan view.
Figure 5:
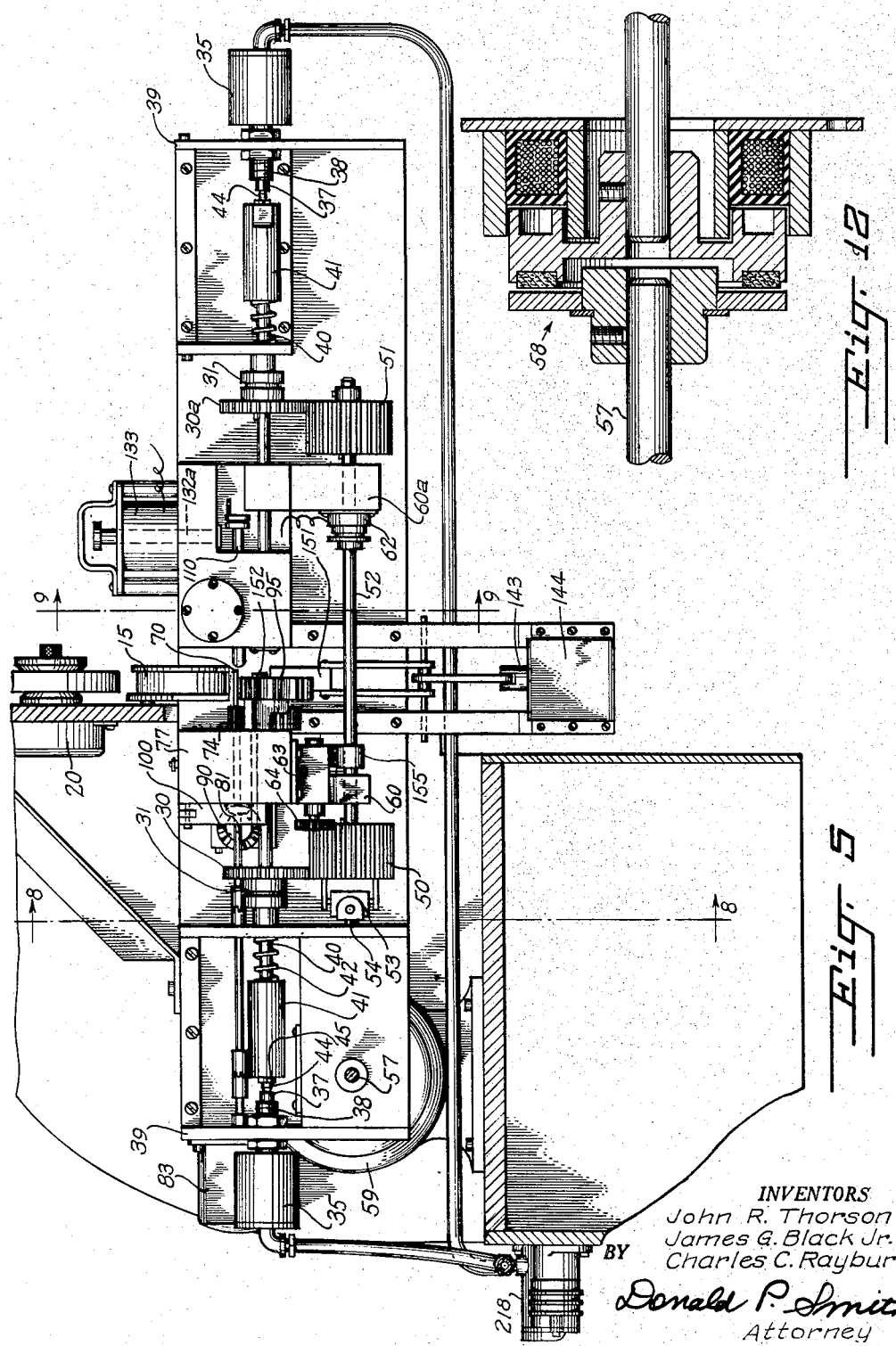
Fig. 5 is a sectional view taken along line 5—5 of Fig. 4.
Figure 6:
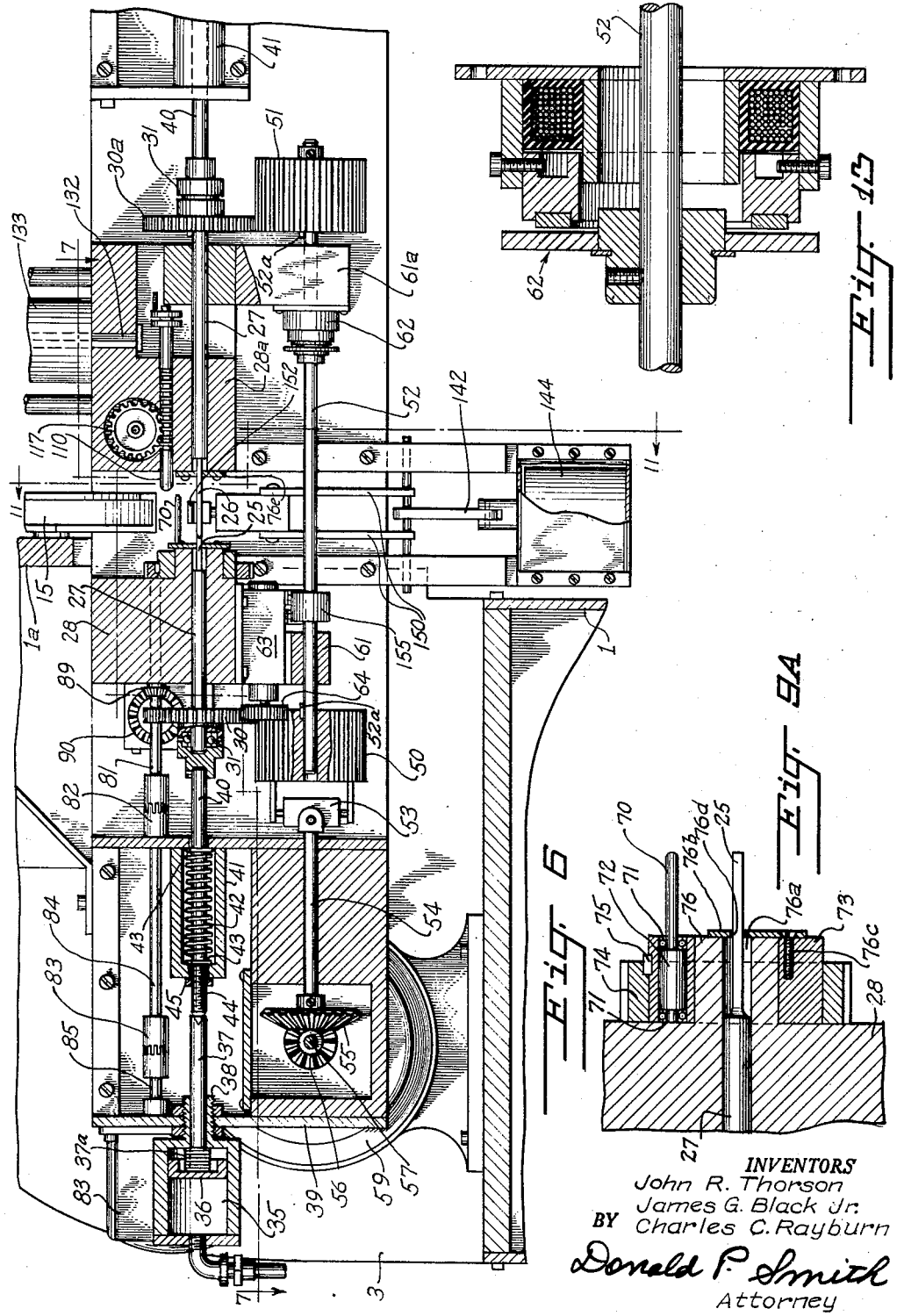
Fig. 6 is a partial sectional view taken along line 6—6 of Fig. 4.

The cylindrical winding mandrel for the capacitors is of the split type with two semicylindrical sections each semi-circular in cross-section and adapted, when associated, to form cylindrical clamping means therebetween for the metal foils and Mylar tapes, as best shown in Figs. 33, 34. The mandrel sections are indicated by reference characters 25 and 26 (Fig. 33). The sections 25 and 26 are axially aligned and each section is rotated and axially shifted by independent and similar mechanism, shown in Fig. 6 of the drawings. The mandrel sections 25 and 26 are each fixed to and extend from adjacent ends of a different one of two aligned shafts 27. These shafts are respectively mounted, for axial rotation in bearing blocks 28 and 28a. The opposite ends of shafts 27, respectively carry gears 30 and 30a and are supported in ball bearing assemblies 31. The mandrel sections 25 and 26 are so constructed and arranged with respect to their shafts 27 as to be axially positioned with respect to their driving means as best shown in Fig. 6. The shaft sections 27 are axially shiftable toward and away from each other by fluid motors 35 having pistons 36 (Figs. 4 and 6) operating against cushioning springs 37a normally tending to return the pistons 36 to the outer ends of their cylinders. The pistons 36 are mounted on the ends of shafts 37 which extend through the bushings 38 fixed to a support panel 39 and these bushings can be suitably packed to provide for proper operation of the motor parts. The shafts 37 are each connected to a respective mandrel shaft 27 by an intermediate shaft 40 mounted in a housing 41. The shafts 40 are associated with the spring 42 which abuts the adjustable washer 43 on the threaded outer end 44 to keep the ball bearing assembly 31 and shaft parts properly associated. Limit nuts 45 control the stroke of the pistons 36 in their motor cylinders 35 so that the admission of fluid into the cylinders 35 will cause the shaft assemblies 37, 40 and 27 to move axially to shift their mandrel sections into proper association.

Figure 7:
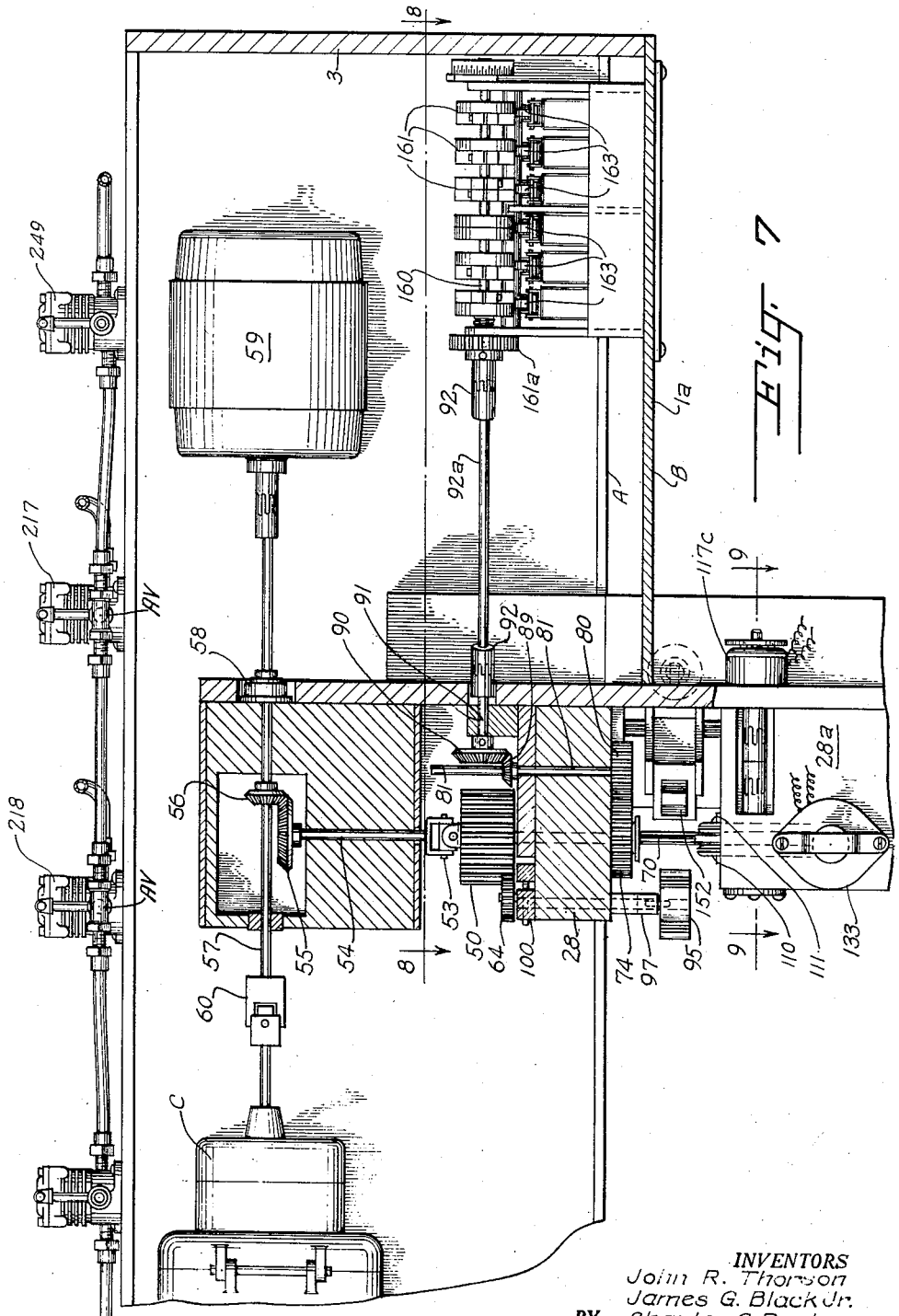
Fig. 7 is a sectional view taken along line 7—7 of Fig. 6.

The shaft sections 27 which rotatably drive the mandrel sections 25 and 26 respectively are independently mounted with respect to their adjacent axially aligned shafts 40. This is accomplished by the arrangement of the ball bearing assemblies 31 carried by the inner ends of the shafts 40 and within which the outer ends of the shaft sections 27 are mounted. By this arrangement axial movement of the shafts 27 and their mandrel sections 25 and 26 is possible independently of the source of power by which they are rotated. The rotation of the shafts 27 is provided by the gears 50 and 51, both mounted on and keyed to shaft 52 and gear 50 is driven by a universal coupling 53, from shaft 54, and meshing beveled gears 55 and 56, the latter being mounted on shaft 57 which is driven through clutch 58 from motor 59 (Figs. 6 and 7). The shaft 57 also drives the counter C (Fig. 7) through universal joint 60, and by this arrangement the counter is only operated at the time of operation of the mandrel sections. By this means the history of the mandrel operation is recorded. It will be noted that shaft 52 upon which the gears 50 and 51 are mounted is supported in bearing supports 61 and 61a and a magnetic brake 62 fixed to the bearing support 61a and shown in detail in Fig. 13, is used to stop the rotation of the mandrel as will be more fully hereinafter described. It will be noted that the gears 50 and 51 are both keyed to the shaft 52 by keys 52a for simultaneous drive and braking through brake assembly 62. A rate generator 63 is driven by the gear 64 meshing with gear 50 for controlling the position of the mandrel sections 25 and 26 so that they will each stop with their flat faces in a vertical position for engaging therebetween the Mylar tape and foil prior to their rotational movement in forming the capacitor structure.

By the mechanism heretofore described, provision has been made for delivering foil and dielectric tape, such as Mylar tape, to a position for association with retractable and rotary mandrel sections 25 and 26 which are capable of clamping the ends of the tape and foil therebetween and of wrapping the same thereabout to form the capacitor. To control and feed the foil and the dielectric tape to the mandrel, gathering mechanism has been provided to include a gathering pin 70 (Figs. 6, 9a, 10, 21 through 26 and 30) of elongated cylindrical form mounted for free rotation in bearings 71 (Fig.9a) positioned at each end of the enlarged inner portion 72 of the pin structure. The pin 70 is mounted on its bearings 71 in the wall of the cylindrical rotor 73 to which is fixed the gear 74 by key 75, the cylindrical rotor 73 and its associated gear 74 being freely mounted on the annular extension 76 of the mandrel bearing block 28 (as best shown in Fig. 9a). The annular extension 76 is formed with a central opening 76a in which the mandrel section 25 is located. A stripper plate 76b is secured by screws 76c to the outer face of the block extension 76 and this stripper plate is formed with a recess 76d having such a diameter that the walls defining the recess will function to strip the capacitor from the mandrel section when the latter is retracted. In this connection a similar stripper 76e is fixed to the face of the block 28a (Fig. 6), in which the other mandrel section 26 is located. The gear 74 is driven by a spur gear 80 keyed on shaft 81 mounted in the mandrel bearing block 28 (Fig. 10). The shaft 81 is connected through couplings 82 and 83 and shaft sections 84 and 85 to a source of power 86 in the form of an electric motor. This electric motor is secured by bolts 87 on the plate 39 of the frame assembly. The shaft 81 driven by the motor 86 also mounts a beveled gear 89 which drives the beveled gear 90 fixed to shaft 91, and through couplings 92 and intermediate shaft 92a rotates a multiple cam assembly for operating the control switches as will be more fully hereinafter described. It will be noted that the gathering pin 70 rotates freely and simultaneously moves in an orbit about the mandrel section 25.

Associated with the gathering pin 70 (Figs. 5, 11, 21 through 28) is a threading wheel 95 rotatably mounted on the pin 96 carried at the end of swinging arm 97 fixed by screws 98 to the shaft 99 journalled in suitable bearings (not shown) in mandrel block 28 (Figs. 27 and 28). A swinging crosshead 100 is fixed to the opposite end of shaft 99 and has its upper end bifurcated to receive and pivotally mount shaft section 102, this shaft section 102 telescoping within tubular shaft section 102ᵃ, the outer extremity of which mounts a collar 103. The collar 103 is fixed to the shaft section 102ᵃ and secured to the block 28 by a screw 104 thus rigidly mounting the shaft section 102 against axial movement. The coil spring 101 mounted on the shaft 102—102ᵃ normally functions to urge the upper end of the crosshead 100 to the left, as viewed in Figs. 25 and 26, for rotating the shaft 99 counter-clockwise. This structure thus provides for a normal urge of the swinging arm 97 inwardly, to the right, in the direction of the gathering pin 70 and leaves the threading wheel 95 free to swing and to rotate during its association with the gathering pin. An adjustable pin 99ᵃ extends through the lower end of the crosshead 100 and engages a stop black 99ᵇ fixed by screw 99ᶜ to the mandrel bearing block 28. By adjusting the stop screw 99ᵃ the inward swinging movement of the arm 97 carrying the threading wheel 95 can be adjusted and limited in accordance with requirements. The threading wheel 95 includes a medial hub portion and a plurality of radial spokes 105, these radial spokes having their extremities enlarged as at 106 and formed with transverse grooves or slots of arcuate cross-section as at 107 for receiving the gathering pin 70 during its orbital travel.

The grooves 107 of the radial spokes 105 are of a length sufficient to receive the working area of the gathering pin 70 and thus are of greater length than the laminated tape and foil forming the capacitor. Obviously the threading wheel 95 and its associated pin 70 are removable and replaceable and interchangeable to provide for the winding of different sizes of structures using tape of greater or lesser width. Detents 108 on threading wheel 95 (Fig. 28) are associated with spring plunger 109 mounted in arm 97 to permit movement of the threading wheel 95 in step-by-step movement. A blower 109a (as seen in Figs. 21–26) is mounted on the mandrel bearing block 28 and is connected with an air impelling source (not shown) and has an outlet aimed generally at gathering pin 70 for the purpose of periodically blowing air in such direction, as described more fully hereinafter.

Figure 9:
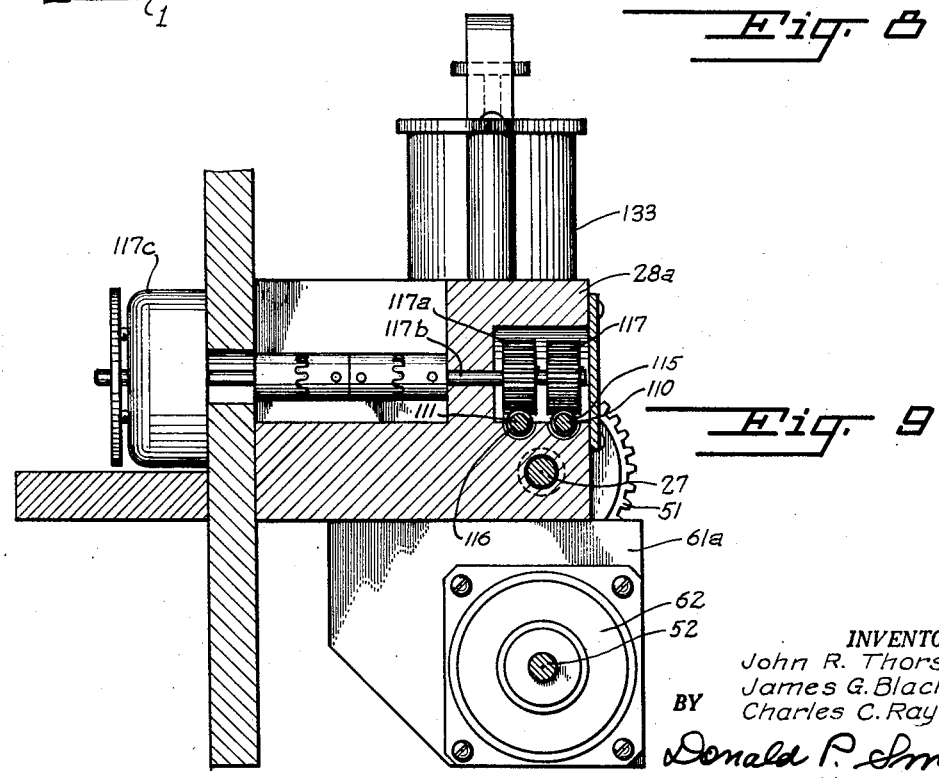
Fig. 9 is a sectional view taken along line 9—9 of Fig. 7.
Figure 15:
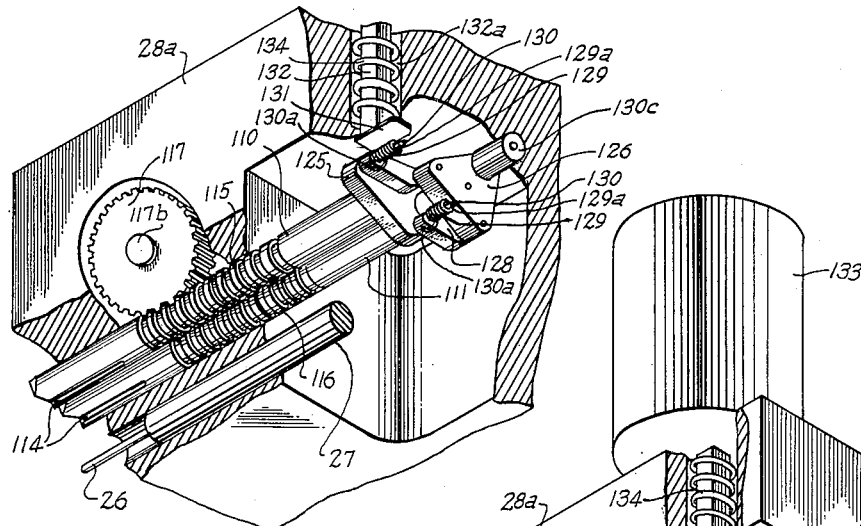
Fig. 15 is a fragmentary perspective view partly in section showing the cutter assembly in retracted position.
Figure 16:
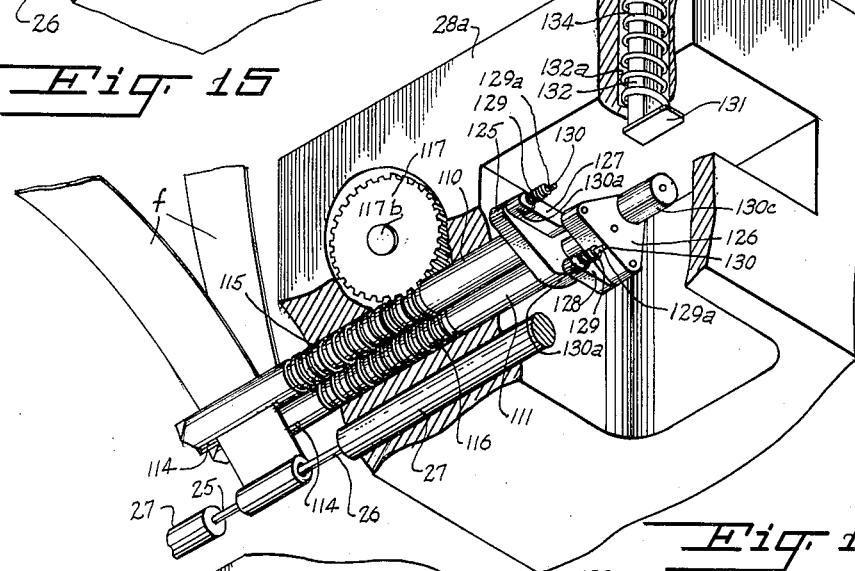
Fig. 16 is a fragmentary perspective view partly in section showing the cutter assembly in extended position.
Figure 17:
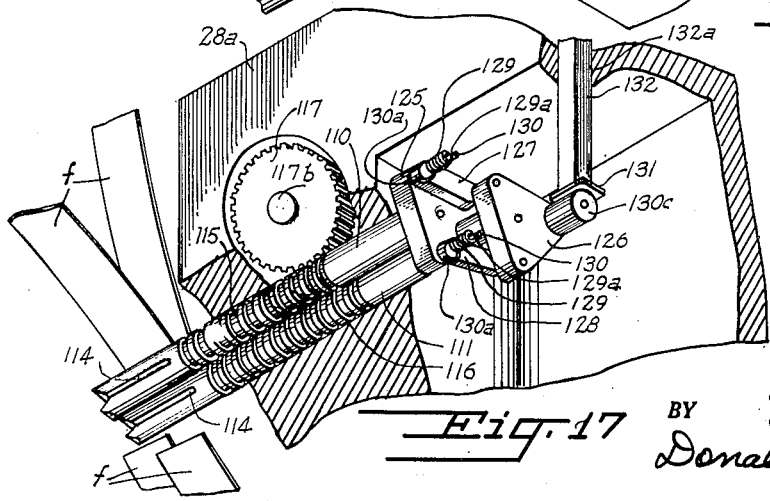
Fig. 17 is a fragmentary perspective view partly in section showing the cutter assembly in cutting position.

The novel winding machine includes mechanism for automatically severing both the foil and the dielectric tape; the mechanism in both instances being synchronized and operated to perform their respective functions at required intervals. In wrapping the capacitor by the present mechanism, the foil is severed before the dielectric tape is cut, this providing for free ends of dielectric material available for wrapping and sealing the foil contained in the structure. In Figs. 15, 16 and 17, the foil severing mechanism is illustrated and comprehends the use of foil cutters of a number to be determined by the layers of foil which are being assembled in the structure. In the present disclosure, two foil cutters are illustrated, these foil cutters being in the form of rods 110 and 111 mounted in the mandrel bearing block 28ᵃ in which is also mounted the supporting structure of the mandrel section 26. The outer ends of the rods 110 and 111 are bifurcated as at 114. This bifurcation 114 is of sufficient depth to receive the entire width of the foil f and to provide the cutting element. By reference to Figs. 18, 19 and 20, the structure of the cutting elements is illustrated and from these figures it will be seen that the bifurcated ends of the cutting elements are tapered and the jaws of the cutting elements 114ᵃ and 114ᵇ are generally of semi-cylindrical form in cross-section with the section 114ᵇ beveled to form a cutting edge 114ᶜ. This cutting edge 114ᶜ upon partial rotation of the cutting rod body directly engaging the foil f as in Figs. 20 and 23 for severing the same. The cutting rods with their cutting edges 114ᶜ are moved axially by rack and pinion structures. Each of the rods 110 and 111 are respectively formed with annular rack teeth 115 and 116, which mesh with pinions 117 and 117ᵃ mounted on the shaft 117ᵇ driven by an electric motor 117ᶜ through suitable couplings as shown in Fig. 9. The rack teeth 115 and 116 are of annular form so that the pinions 117 and 117ᵃ will mesh with the teeth and function to reciprocate the cutter rods regardless of their rotational position.

Figure 22:
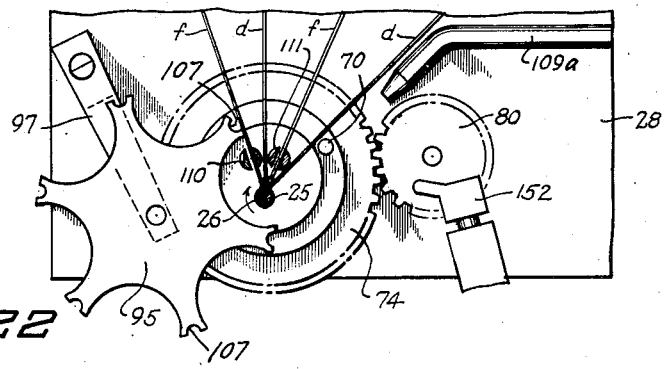
Fig. 22 is a similar view showing the initial winding movement with the cutters projected.

In addition to the advancing and retracting of the cutter rods, they are provided with means for quick partial rotation to tension and cut the foil which extends through the slots 114 forming the bifurcation. This mechanism (as seen in Figs. 15–17) includes triangular heads 125 and 126 fixed respectively to the inner ends of the rods 110 and 111 and linked together by links 127 and 128 for simultaneous similar partial rotation. Coil return springs 129 are mounted on extensions of pins 130 forming the pivotal connections of the links 127 and 128 with the triangular head 125 directly fixed to the inner ends of the cutter rods 110 and 111. The outer terminals of the springs 129 are fixed as at 129ᵃ to the outer ends of the fixed pivot pins 130 while the inner ends 130ᵃ of the springs 129 engage in suitable recesses in the adjacent surfaces of the links. These springs, due to their assembly and arrangement, tend to normally urge the cutter rods 110 and 111 and the heads 125 and 126 fixed respectively thereto to the normal foil feeding position of the foil cutter slots 114 which is a vertical position as shown in Figs. 16 and 22. The triangular head 126 is provided with a projecting roller 130ᶜ which is in the path of movement of the foot element 131 of the reciprocally movable armature extensions 132 actuated by the solenoid 133 through actuating circuit 133ᵃ hereinafter described, a coil spring 134 being provided to normally position this structure for actuation through the cam switches heretofore mentioned and to be hereinafter described. It will be noted that the armature extension 132 is of angular form to prevent its rotation in the guide slot 132ᵃ formed in the frame. Rotation of the linked triangular heads 125 and 126 by foot element 131 turns rods 110 and 111 to a position, shown in Figs. 16, 19 and 23, where the respective foils f are severed.

Figure 24:
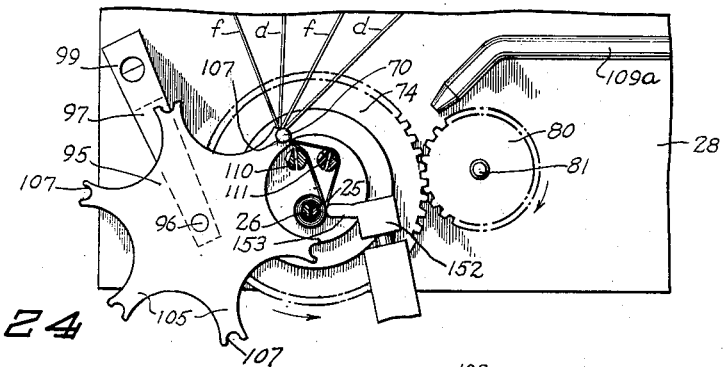
Fig. 24 is a similar view showing the sealing and cutting position.
Figure 25:
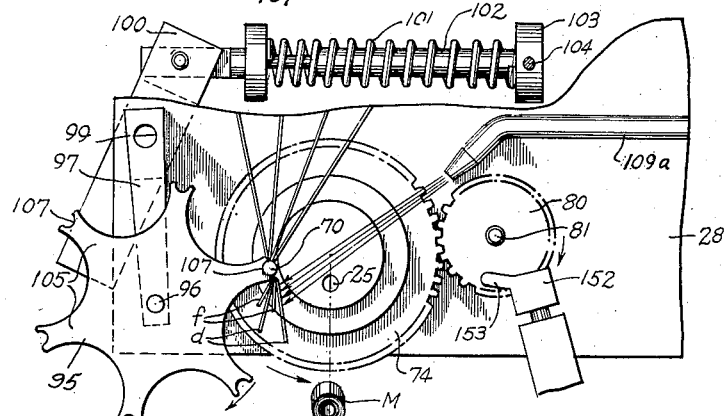
Fig. 25 shows the mandrel retracted, the capacitor discharged and the gathering mechanism operating.
Figure 26:
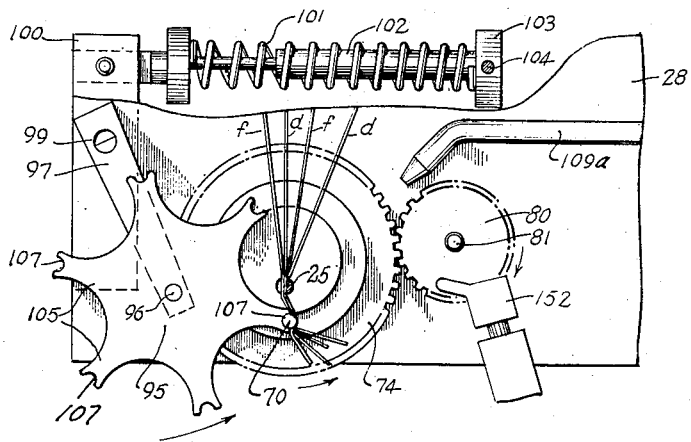
Fig. 26 shows the gathering mechanism at the start of the winding and with the foil and dielectric tapes in the mandrel.

After the foil has been severed by the foil cutting or snapping means described, the dielectric tape will continue to wrap about the foil for a desired number of turns to complete a sealing operation (Fig. 23) and after the structure has been suitably completed in accordance with the prescribed number of laminations as determined by the operating synchronizing mechanism, the Mylar tape is simultaneously sealed and severed. This sealing and severing mechanism is illustrated in Figs. 11 and 24 through 26, and includes a medial supporting structure 140 upon which is mounted a rocker arm 141 carrying at one end the vertical pivoted arm 142 connected to the core 143 of the actuating solenoid 144. The other end of the rocker arm 145 is connected with a dashpot structure including the cylinder 146 and plunger 147 pivotally connected with the lower end portion of the arm 145. The cross arm has an angularly vertically extending portion 150 which is actuated by the rocker arm 141 and the upper end of this arm 150 carries an electric heater 151 with a heated cutting and sealing head 152. The head 152 includes a nose extension 153 which is adapted to be swung into engagement with the dielectric tape after it is fully wound about the capacitor body (Figs. 24, 25 and 26). By control means to be hereinafter described, the electromagnet 144 will swing the heated sealing and cutting member 153 into contact with the Mylar and cause it to adhere to the capacitor body and to simultaneously be severed from the structure.

Figure 11:
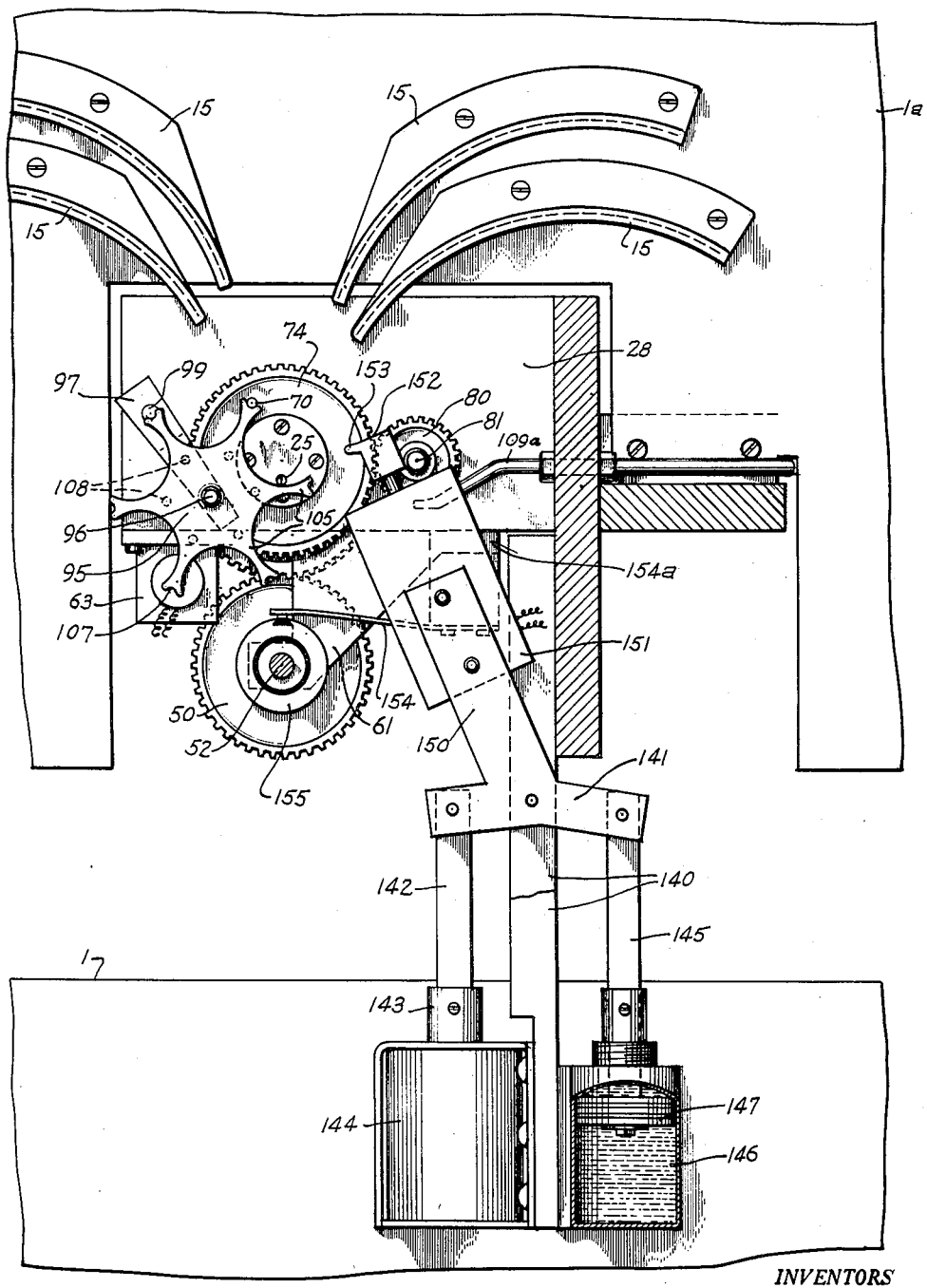
Fig. 11 is an enlarged sectional view taken along line 11—11 of Fig. 6.

Contact arm 154 shown more clearly in Fig. 11 is carried by the support 154ª for association with the commutator 155 mounted on the power shaft 52 for determining the point of rotation in the shaft movement at which it is to be stopped and whereby the mandrels 25 and 26 are positioned with their material-engaging faces in vertical position. The circuit and controlling mechanism for this operation will hereinafter be described.

Figure 8:
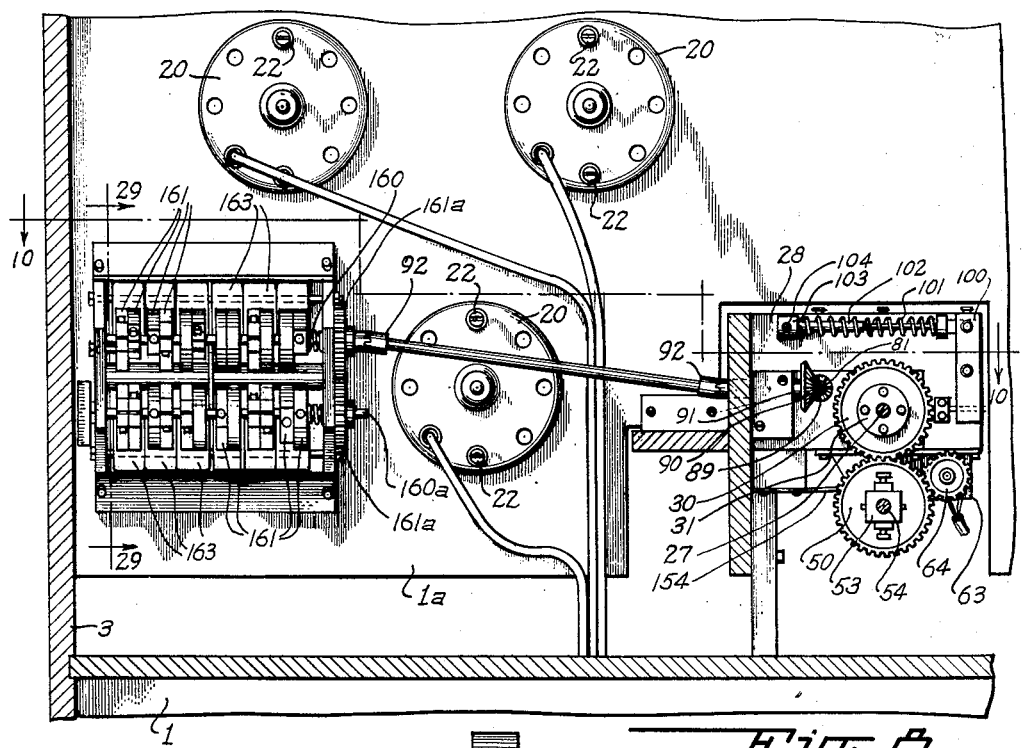
Fig. 8 is a sectional view taken along line 8—8 of Fig. 7.

As previously stated, the power shaft 81 which drives the gathering pin 70 (Figs. 6 and 10) likewise drives a lateral shaft 91 which is coupled to a cam shaft 160 upon which are mounted a multiplicity of cams indicated generally by reference character 161 (Fig. 8). A further cam shaft 160ª is driven by shaft 160 through gears 161ª and carries additional cams 161 as shown in Fig. 29. These cams 161 are adjustable about their respective shafts 160–160ª to vary their consecutive timing of the operation of a plurality of switches, indicated at 163, these switches actuating different motors controlling the various sources of power from which the parts are operated.

Figure 21:
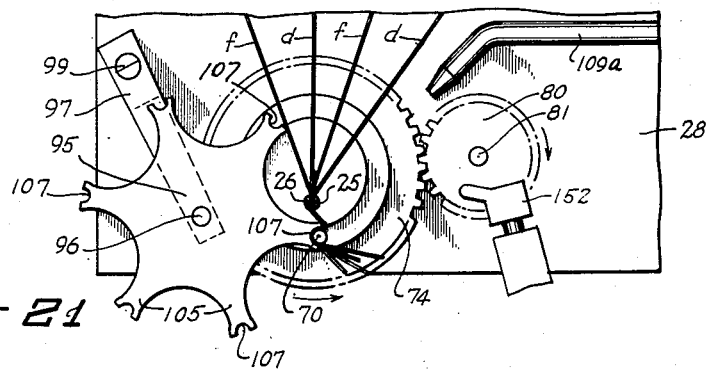
Fig. 21 is a diagrammatic end elevation showing the gatering mechanism associated with the mandrel.

In Figs. 21 through 26 there are generally diagrammatic illustrations of the positions of the parts immediately involved in the formation of the capacitor including the winding mechanism, the gathering mechanism, the foil severing mechanism, and the dielectric tape cutting and sealing mechanism when automatically operated. In the position of Fig. 21 the foils f and dielectric tapes d are shown in position for automatic capacitor forming operation and in this position the two sections 25 and 26 of the mandrel are shown extended with the foil and dielectric tape clamped therebetween and the gathering pin 70 binding the foil and dielectric tape into a transverse arcuate recess 107 of the threading wheel 95. When in the position of Fig. 21, the winding mandrel formed of sections 25 and 26 rotates, wrapping the tape thereabout as shown in Fig. 22 and in this figure the foil cutting cutters 110 and 111 have been projected to a position straddling the foil. While the foil cutters are being projected the gathering pin has moved from the position shown in Fig. 21 to a substantially neutral position as shown in Fig. 22 where the gathering pin is no longer in operative association with either the foil or the tape.

Figure 23:
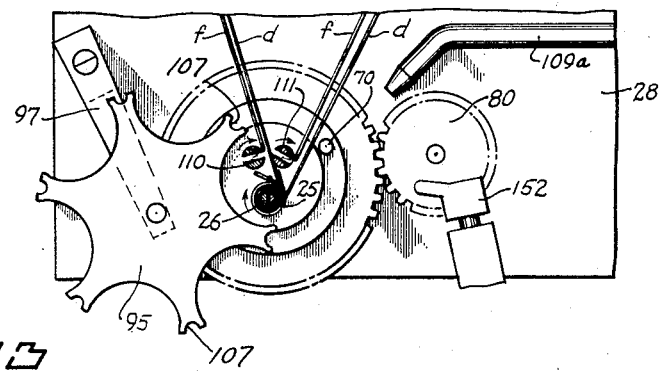
Fig. 23 is a similar view after the foil cutters have functioned at the end of the winding.

In Fig. 23 the winding of the foil in the capacitor is shown as terminated due to the operation of the cutters 110 and 111 which have been rotated to their cutting position as indicated. In this position the dielectric tape is still intact and is still being wound about the capacitor to wrap the free ends of the foil into the coil assembly. In both the positions of Fig. 22 and Fig. 23 the position of the threading wheel 95 remains in a position where it is available for engagement with the gathering pin 70, this being provided for by means of the stop pin 99ª as shown in Fig. 27.

In Fig. 24 the foil has been partly retracted by the motors 20 (Fig. 14), which are controlled to oppose the unwinding of the foil from the spools as heretofore described and the foil and dielectric tape has been clamped between gathering pin 70 into an upper groove 107 of the threading wheel. In this position the cutters 110 and 111 have returned to their normal projected position, i.e. with their slots generally vertical, and the sealing and cutting head 153 has swung into engagement with the dielectric tape which has continued to be wound about the loose ends of the foil as illustrated in Fig. 23. The heat from the head 153 is sufficient to cause the dielectric tape to adhere to the outer surface of the capacitor body and this sealing operation involves the use of sufficient heat to sever the dielectric tape. Obviously this leaves the extremities of the dielectric tapes d, d extending the foils f, f and with this relative position of the foil and tape, the ends of the tape and foil are moved under urge of the driven gathering pin to the position shown in Fig. 25. In this figure it will be noted that the cutters 110 and 111 have been retracted and the blower 109ª is functioning to keep the extremities of the foil from adherence to the metallic parts of the winding head due to static accumulating in the material. In the position of Fig. 25 it will be seen that the two sections 25 and 26 of the mandrel have been retracted, releasing the capacitor M, and that the gathering pin is continuing to lower the extremities of the foil and tape and to move the foil and tape to a position for engaging the half-section 25 of the mandrel which has been returned to winding position as shown in Fig. 26. It will be noted that the threading wheel 95 under urge of its spring 101 follows the gathering pin 70 and moves the extremities of the foil and tape against the flat upright face of the mandrel section 25 and when in this position the second mandrel section 26 advances to clamp the foil and tape therebetween, as illustrated in Fig. 21 and as heretofore described. It will be noted that in Fig. 25 the sealing and cutting head 152 has been retracted from its association with the capacitor and this head 152 remains in the retracted position throughout all of the other operations.

To obtain a precisely timed sequence of operations which is automatically repeated for the winding of each capacitor, two principal motor driven switches are provided, alternating in duty through separate portions of each cycle. The first switch is referred to hereinafter as the "cyclo-monitor." This switch C (Fig. 7) is described in detail in U.S. Patent No. 2,489,474 of K. H. Andren and is not in itself the subject of the present invention. The cyclo-monitor C is a rotation-counting reversing switch driven in unison with the winding mandrels. In the present application it is used to actuate a single pole double throw micro-switch 203 (Fig. 35), after being rotated by shaft 57 through a preset number of revolutions in a forward stroke. The cyclo-monitor C then automatically reverses and returns to its original position with a continued and predetermined rotation of shaft 57 in a return stroke. At a preset position in the return stroke, the switch 203 is restored to its normal position. The cyclo-monitor again reverses at the end of the return stroke. The first actuation of the micro-switch 203 instantaneously actuates the means for cutting the metallic foils f and for braking the spools 8 and 9 which supply these foils. The restoration of switch 203 during the return stroke actuates the braking and declutching system for the main drive, to be described more fully hereinafter, and starts the gathering motor 86. The gathering motor drives the second of the two principal switches operating during the portion of the cycle when the cyclo-monitor, having been declutched, is at rest. The second set of switches 163 is actuated respectively by cams 161. These serve to actuate in proper sequence the operations necessary to seal and release a finished capacitor, to gather and re-thread the foil and tapes for the next capacitor, to start the mandrel rotation (and cyclo-monitor switch) and finally to stop the cam rotation by deenergizing the gathering motor 86. One cycle for the cams 161 consists of a 360 degree rotation of the camshaft 160.

With the foregoing in mind as a general description of the operation of the control circuits, consider now the details of these circuits as shown in the schematic diagrams of Figs. 35 and 36 in conjunction with a description of the operations incident to a complete cycle wherein one capacitor is wound and discharged and another is started. For a starting point consider that the condenser strips have been threaded and are now wound to the desired or pre-set number of turns. The cyclo-monitor C, having reached one end of its reciprocal cycle, micro-switch 203 is closed completing the circuit between A.C. power source 200 through conductor 202 and contact 204 to relays R1, R2, R4 and R7 energized in rapid sequence. The various switches which are driven by camshaft 160—160a are shown at the bottom of Fig. 35 with designation, on each corresponding to the angular rotation of camshafts 160—160a, at which the particular switch is closed and opened. The cam switches which will be closed at the 360 degree position when the camshaft and motor 86 are at rest include those for which the "close" angle is greater than the "open" angle. Reference to Fig. 35 will indicate such to be the case for cam switches CS3, CS5, CS6, CS8 and CS9. Cam switch CS3 is in series with CS2 which is open at this point so a description of its function will be deferred until later. The others are closed each in series relationship to micro-switch contacts 203, 204 so that each of these operate to perform a particular function. Relays R1, R2, R4 and R7 are provided with holding contacts designated respectively as 1A, 2A, 4A and 7A which actuate each relay in succession and hold the set in operation after the micro-switch contacts 203, 204 are opened. Relay R1 is energized through closed switches 203 and CS5 to close the operating circuit 133a to the solenoid 133 through switch contact 1B, causing the quick partial rotation of cutting elements 110 and 111 to sever the metallic foils as heretofore described. Relay R2 acting by opening contacts of switches 2B (one illustrated) removes the alternating current power from the drag motors 20 acting on the foil spools 8 and 9 and simultaneously discharges a 300 microfarad condenser 211 (one illustrated) through each motor winding. In Fig. 35 only one of the two contacts and capacitor discharge circuits for the spool motors is shown; the other being identical in all respects, is omitted to avoid unnecessary complexity of the drawings. The discharge of the capacitors 211 through the windings of each foil spool motors 20 serves to substantially augment the braking torque applied by these motors thereby preventing the spools from overrunning. The two identical circuits provided for charging each of the two capacitors, each consists of a rectifying element 212, series connected current limiting resistor 213, and the capacitor 211. Relay R4, connected across power source 200—201 through CS6, acts to connect the main-motor stop-relay R5 to one side of the A.C. power source 201 through relay switch contact 4B. This step sets the stop-relay circuit for operation at the subsequent restoration of micro-switch 203 to contact 205 by the cyclo-monitor. Relay R7, through contact 7B and CS8, likewise sets the circuit of the gathering motor 86 for operation by restoration of micro-switch 203 to its contacting position with terminal 205.

The aforedescribed control actions of relays R1, R2, R4 and R7 occur either simultaneously with or shortly preceding reversal of the drive mechanism within the cyclo-monitor. After another preset number of turns on the return stroke of the cyclo-monitor, micro-switch 203 is restored in contact with terminal 205 to complete circuits energizing relays R5 and R6 by the means already described in connection with the preparatory function of relays R4 and R7, respectively. With energization of R5, the clutch-brake control circuit brings shafts 52, the rotating mandrels 25 and 26 and the cyclo-monitor C to rest. Relay R6 starts the gathering motor 86 and thereby initiates the rotation of cam 160 through a full revolution of 360 degrees. The sequence of operations initiated by the cam switches during the 360 degrees rotation follows the pattern prescribed in the description of the mechanical operation of the machine. At 60 degrees the power to the spool brake relay R2 is removed by CS9. As holding contacts for R1 include contact 2A of R2, relay R' is also de-energized at 60 degrees allowing the cutter elements 114 and 114a to be restored to their normal orientation by springs 129. At 90 degrees CS1 is closed energizing the solenoid 144 so as in conjunction with dashpot 147 to effect a properly sustained application of sealing iron 153 causing the Mylar films to be severed and the cylindrical shell of the capacitor to be sealed. Capacitor 214, like others shown across inductive loads, is provided to suppress arcing at the switch contacts. Also at 90 degrees, CS4 closes, energizing cutter retracting motor 117c with direct current through rectifier bridge 248. The cutters begin to retract so as to be out of the way during the threading operation. At 94 degrees CS2 (upper right) closes, energizing solenoids 217 and 218 so as to supply air through air valves AV to the power cylinders 35 to operate driving pistons of the mandrels 25 and 26 thereby withdrawing the mandrels from the capacitors. At 95 degrees the sealing iron is withdrawn by the opening of CS1. Shortly after the completed capacitor falls out, CS10 closes, supplying air to nozzle 109 by means of air valve solenoid 249 so as to facilitate the functioning of gathering pin 70. After 30 degrees more of rotation at 130° the air jet is turned off by the opening of CS10. Simultaneously CS3 is opened removing the power from mandrel control valve solenoid 217 which permits the front mandrel 25 to be moved into winding position by spring 42. After the front mandrel 25 is positioned, the gathering pin 70 with threading wheel 95, having captured the four layers of tape and foil (Fig. 24), rotates so as to lay the combined strips against the flat face of the extended half mandrel 25. At 240 degrees CS2 opens to de-energize solenoid 218 to permit spring 42 to move the semi-cylindrical portion of mandrel 26 into winding position to clamp the foil and tape securely between the adjacent vertical faces of the two half-mandrels 25 and 26. At 255 degrees CS6 opens, deenergizing relay R4, allowing switch 4-B to open and remove the power from relay R5. By means of the clutch brake circuit, still to be described, this engages the clutch and starts the winding action of the mandrels and the motion of the cyclo-monitor. As the capacitor coil is wound, the cyclo-monitor C and cam switches 161 operate for a time simultaneously, the latter closing CS3 at 260 degrees but not completing a circuit here, and turning off the gathering motor 86 to 320 degrees through the opening of switch CS8. The gathering motor and cam switches then coast to 360 degrees, closing in this portion of the cycle, switches CS5, CS6, CS8 and CS9 preparatory to the switching of the cyclo-monitor C. Also in coasting to 360 degrees, CS4 is opened permitting the cutters to emerge and straddle the strips of foil. A new condenser coil is now being wound awaiting the action of the cyclo-monitor C to close micro-switch 203 and thus one cycle is complete. Each revolution of the cam switches 161 is recorded by counter solenoid 219 in conjunction with CS7. This counter is of an impulse type of conventional design and therefore will not be further described.

In the foregoing exposition of the operation of the control circuit, the description of the mandrel-clutch and brake control circuit was referred to a subsequent section. It is the purpose of the brake system to cause the mandrels to come to rest only in an orientation properly facilitating subsequent threading. With the brake control circuit, this is accomplished by reducing the speed of rotation of the winding mandrels so that when final brake action is set by arrival at a preset angular orientation of commutator switches 154 and 155 (Fig. 11), the mandrels will stop in the desired angular position in a dependable and reproduceable manner on the insulation 155a.

Referring to Fig. 36 in which the numbered terminals of relay switch R5 correspond to those on Fig. 35, the control system in comprised essentially of a rate generator 62, a commutator switch 155 (Fig. 11) and a direct coupled amplifier employing four stages of amplification with four triodes $V^1$, $V^2$, $V^3$ and $V^4$. The windings for the magnetic clutch 58 and brake 62 are in the anode circuits of $V^3$ and $V^4$, respectively. In general the conditions of operations for the D.C. amplifier and for the clutch 58 and brake 62 are arranged to permit three stable states: one for the "run" position in which current through the clutch control tube $V^3$ is a maximum and the brake control tube $V^4$ is cut off; second for the "slow" position in which a reduced current flows through both $V^3$ and $V^4$, and both clutch and brake slip so as to reduce the speed of the winding mandrels; and third for "stop" position in which current through brake control tube $V^4$ is a maximum. In Fig. 36 typical values of operating voltage for the run condition designated by the caption R and for the stop condition designated by S are shown for a circuit in which $V^1$ and $V^2$ are one-half sections of a type 12AX7 tube and $V^3$ and $V^4$ are half-sections of a type 6080 tube with circuit components having values as shown. These values are included as an aid to an understanding of the operation of a practical circuit but not to limit the invention to the use of these particular tubes or component values except as limited by the scope of the claims.

Consider now the function of the clutch-brake circuit for each of the three operating conditions. First for the "run" condition contact 5A of relay 5 is in the run position tieing the grid 221 to the cathode 220 of $V^1$ through terminal 208, contact 5A and terminal 206. The lack of negative bias on grid 221 causes $V^1$ to conduct heavily. Of the voltage available from the B+ supply applied across series connected resistor 224, speed control potentiometer 223, and tube $V^1$, the increased conductance of $V^1$ reduces the positive voltage at the potentiometer output 223ª. By direct coupling to the gird 229 of $V^2$ through resistor 225, the reduced voltage of 223ª effectively biases $V^2$ to cut-off. In the second stage then, the impedance of cut-off tube $V^2$ is high compared to that of plate load resistor 231 yielding a high positive potential at anode 230 and causing neon-tubes 232 to conduct, thereby driving the grid 235 of $V^3$ positively with respect to its cathode 234. The cathode 228 of $V^2$ is held positive by connection with point B on the power supply through current limiting resistor 227 and neon tube 226 maintains its voltage constant. With loss of its bias, $V^3$ conducts heavily through plate load 237 and the series connected clutch-actuating winding 58. With the reduced positive potential at anode 236, there is insufficient voltage to start conduction of the neon-tubes 238 so that $V^4$ remains cut-off by the lack of a sufficient positive potential on grid 241, and the brake 62 is not energized.

For the third or "stop" condition of full brake current through $V^4$, contact 5A of relay 5 is in position to connect terminal 207 but the commutator 155 has revolved to a position whereby the insulated segment has opened the circuit between the cathode 220 and the gird 221 of $V^1$. The electron space current quickly biases the floating grid 221 of $V^1$ to cut off, increasing the positive voltage at potential divider 223ª so as to remove the negative bias of $V^2$ thereby causing heavy conduction in $V^2$. The reduced positive voltage between anode 230 and ground point G is not sufficient to maintain conduction of neon-tubes 232 so that grid 235 falls to zero potential, thus cutting off $V^3$ with its positive cathode 234 through connection thereof to power supply terminal B. The increased potential at plate 236 starts conduction of neon-tubes 238 and thereby reduces the bias on grid 241 of $V^4$ to zero. The heavy conduction in $V^4$, resulting from the loss of bias, energizes the brake actuating coil 62 and sets the brake.

For the intermediate or "slow" condition, a bias on $V^1$ regulated between the zero value for full conduction (or "run") and the negative value for full cut-off (or "stop") is provided by a servo feed back loop. Here the speed of the mandrel rotation is sensed by the mechanically coupled rate generator 62 which provides a negative bias on $V^1$ directly proportional to mandrel speed. The greater the mandrel speed, the greater the negative bias, the less the conduction in $V^1$ and thus the greater the braking effort. The reverse situation exists for decreased mandrel speed so that an equilibrium state of constant and reduced speed is quickly attained. In practical operation of the machine, the mandrel speed is reduced during "slow" operation to a speed just sufficient to allow stopping in proper orientation without excessive overshoot. Speed control is obtained by adjustment of the position of potential divider 223 as indicated in Fig. 36. During "slow" operation, the operating voltages lie intermediate between those specified by way of example for the "run" and "stop" operation and the neon-tubes 232 and 238, coupling tubes $V^2$ with $V^3$ and $V^3$ with $V^4$, respectively, remain in conduction.

The power supply is shown as a voltage doubler consisting of rectifiers 243 and 244 and capacitors 245 and 246. As this type of supply is well known in the art it will not be further described. Equivalent sources of D.C. potential, such as transformer operated half- or full-wave rectifiers or a battery pack could also be employed without departing from the scope of the present invention.

What we claim is:

1. In an automatic machine for making capacitors from alternate layers of foil tape and dielectric tape, a machine frame, a plurality of spool supports mounted on said frame, a plurality of guides for guiding the tape from said spools to a winding mechanism, said winding mechanism including a sectional mandrel, a gathering mechanism mounted on said frame for collecting the foil tape and dielectric tape for association with said mandrel, said gathering mechanism including a gathering pin rotatable about the axis of said sectional mandrel and a gathering wheel associated therewith, said gathering wheel including spaced peripheral grooves for seating the gathering pin when it engages the foil tape and dielectric tape, means for moving said mandrel sections into tape and foil clamping and wrapping position, and means for rotating said sectional mandrel to form a capacitor coil and to sever the foil after a predetermined number of rotations by the mandrel, means for simultaneously severing and sealing the tape subsequent to the severing of the foil, and means for separating the sectional mandrel for releasing the capacitor formed thereon.

2. In an automatic machine for making capacitors from alternate layers of foil tape and dielectric tape, a machine frame, a plurality of spool supports for holding the tape spools mounted on said frame, a source of power, winding mechanism including a mandrel structure, means for securing the tapes to the mandrel to form a capacitor thereabout, switch controlled means operated by the rotation of the mandrel for severing the foil, additional means for sealing and severing the dielectric tape after the foil has been severed, gathering means for accumulating the tape extremities after they are severed for connection with said mandrel for a repeated winding operation, said gathering mechanism including a threading wheel having a plurality of transverse grooves formed in its peripheral edge, said threading wheel being pivotally mounted and normally urged in the direction of said mandrel, and a gathering pin, said gathering pin being mounted for rotation in an orbit about said mandrel for engaging the extremities of said tapes and clamping the same in said grooves in the threading wheel and for moving the same to a position for attachment to said mandrel.

3. The structure of claim 2 characterized in that the gathering pin which is mounted for movement about the axis of the mandrel is driven from a motor controlled by a cyclo-monitor driven from the mandrel.

4. The structure of claim 2 characterized in that the gathering pin which is mounted for movement about the axis of the mandrel is driven from a motor controlled by a cyclo-monitor driven from the mandrel, the motor operating a multiplicity of cam switches sequentially controlling the sealing and release of the finished capacitor.

5. The structure of claim 2 characterized in that the gathering pin which is mounted for movement about the axis of the mandrel is driven from a motor controlled by a cyclo-monitor driven from the mandrel, the motor operating a multiplicity of cam switches sequentially controlling the sealing and release of the finished capacitor and deenergizing the motor driving the gathering pin.

6. The structure of claim 2 characterized in that means are provided for feeding the tape from the tape spools to the mandrel in alternately laterally staggered relation.

7. The structure of claim 2 characterized in that the severing means for the foil is mounted in the frame and is axially movable to engage and sever the foil prior to the severing of the dielectric tape, the foil severing means being bifurcated for the passage of the foil and being rotatable about its own axis.

8. The structure of claim 2 characterized in that separate severing means for each foil strip is mounted in the frame and are axially movable to engage and sever the foil prior to the severing of the dielectric tape, the foil severing means being bifurcated for the passage of the foil to present a pair of spaced arms one of which is formed with a cutting edge and are rotatable about their own axes.

9. An automatic machine for making capacitor coils from foil and dielectric tapes, a machine frame, a plurality of tape supports for holding said tapes mounted on said frame, a winding mechanism including a mandrel, guide means for guiding said tapes to said mandrel, means for rotating said mandrel to wind said tapes into a capacitor coil, means for severing said foil tape after a predetermined number of rotations by said mandrel, said foil tape severing means including a longitudinal member mounted on said frame and having a bifurcated end for receiving said foil tape, means for projecting said bifurcated end of said member longitudinally into the path of said foil tape to straddle said tape, and means for rotating said longitudinal member about the longitudinal axis thereof to cut said foil tape.

10. An automatic machine for making capacitor coils from a plurality of foil and dielectric tapes, a machine frame, a plurality of tape supports for holding said tapes mounted on said frame, a winding mechanism including a mandrel, guide means for guiding said tapes to said mandrel, means for rotating said mandrel to wind said tapes into a capacitor coil, means for severing said foil tapes after a predetermined number of rotations by said mandrel, said foil tape severing means including a plurality of longitudinal members mounted on said frame, each of said longitudinal members formed with a bifurcated end for receiving a respective one of said foil tapes, means for projecting said bifurcated end of said each member longitudinally into the path of said respective foil tape to straddle said respective foil tape, and means for rotating said each longitudinal member about the longitudinal axis thereof to cut said respective foil tape.

11. An automatic machine for making capacitor coils from foil and dielectric tapes, a machine frame, a plurality of spool supports for holding said tapes mounted on said frame, a winding mechanism including a mandrel, guide means for guiding said tapes along respective paths to said mandrel, means for rotating said mandrel to wind said tapes into a capacitor coil, means for severing said foil tape after a predetermined number of rotations by said mandrel, said foil tape severing means including a longitudinal member mounted on said frame and having a bifurcated end including portions spaced to receive said foil tape, one of said bifurcated end portions comprising a knife edge, means for projecting said bifurcated end of said member longitudinally into the path of said foil tape to straddle said tape, and means for rotating said longitudinal member about its longitudinal axis to bring said knife edge into contact with said foil tape to cut said foil tape.

12. An automatic machine for making capacitor coils from foil tape and dielectric tape, a machine frame, a plurality of spool supports for holding said tapes mounted on said frame, a winding mechanism including a mandrel, guide means for guiding said tapes along respective paths to said mandrel, means for rotating said mandrel to wind said tapes into a capacitor coil, means for severing said foil tape after a predetermined number of rotations by said mandrel, said foil tape severing means including a longitudinal member mounted on said frame and having a bifurcated end including a pair of portions spaced to receive said foil tape, one of said bifurcated end portions comprising a knife edge, means for projecting said bifurcated end of said member longitudinally into the path of said foil tape to straddle said tape, means for rotating said longitudinal member about its longitudinal axis to bring said knife edge into contact with said foil tape to cut said foil tape, and means for severing said dielectric tape from said capacitor coil, said last means including a heater element for sealing the coil end of said severed dielectric tape to said capacitor coil.

13. An automatic machine for making capacitor coils from foil and dielectric tapes, a machine frame, a plurality of tape supports for holding said tapes mounted on said frame, a winding mechanism including a mandrel, guide means for guiding said tapes to said mandrel, means for rotating said mandrel to wind said tapes into a capacitor coil, and means for severing said foil tape after formation of a capacitor coil by winding on said mandrel, and means for severing said dielectric tape from said capacitor coil, said last means including a heater device positioned adjacent to said mandrel for sealing the coil end of said severed dielectric tape to said capacitor coil.

14. An automatic machine for making capacitor coils from foil and dielectric tapes, a machine frame, a plurality of tape supports for holding said tapes mounted on said frame, a winding mechanism including a mandrel guide means for guiding said tapes to said mandrel, means for rotating said mandrel to wind said tapes into a capacitor coil, means for severing said foil tape after formation of a capacitor coil on said mandrel, and means for severing said dielectric tape from said capacitor coil, said last means including a heater device pivotally mounted on said frame adjacent to said mandrel for sealing the coil end of said severed dielectric tape to said capacitor coil, and means for moving said heater element into contact with said coil after the severing of said foil tape.

15. An automatic machine for making capacitor coils from foil and dielectric tapes, a machine frame, a plurality of tape supports for holding said tapes mounted on said frame, a winding mechanism including a mandrel, guide means for guiding said tapes to said mandrel, means for rotating said mandrel to wind said tapes into a capacitor coil, means for severing said foil tape after formation of a capacitor coil on said mandrel, and means for severing said dielectric tape from said capacitor coil, said last means including a heater device pivotally mounted on said frame adjacent to said mandrel, said heater device including a cutting and sealing head, means for moving said head into contact with said coil for cutting said dielectric tape and for sealing the coil end of said dielectric tape to said capacitor coil, and a blower tube mounted on said frame and directed at said mandrel for directing gas on the tape end of said cut dielectric tape.

16. A machine for winding capacitor coils from foil and dielectric tapes, a frame, a plurality of tape supports mounted on said frame, a winding mechanism for winding said tapes into a capacitor coil, tape guide means for guiding said tapes from said tape supports to said winding mechanism, said winding mechanism including a tape gathering pin, means mounting said gathering pin on said frame for lateral movement in a path, and a gathering wheel rotatably mounted on said frame and including a plurality of grooves spaced on the periphery thereof, said grooves extending into said path of said gathering pin whereby said tapes may be clamped into said grooves by said gathering pin.

17. A machine for winding capacitor coils from foil and dielectric tapes, a frame, a plurality of tape supports mounted on said frame, a winding mechanism including a mandrel for winding said tapes into a capacitor coil, means mounting said mandrel on said frame for coil winding rotation about its longitudinal axis, tape guide means for guiding said tapes from said tape supports to said mandrel, said winding mechanism including a tape gathering pin, means mounting said gathering pin on said frame for lateral movement in a path adjacent to said mandrel axis, a gathering wheel rotatably mounted on said frame and including a plurality of grooves spaced on the periphery thereof, said grooves extending into said path of said gathering pin whereby said tapes may be clamped into said grooves by said gathering pin, and means for moving said gathering pin in said path to feed said clamped tapes into contact with said mandrel.

18. A machine for winding capacitor coils from foil and dielectric tapes, a frame, a plurality of tape supports mounted on said frame, a winding mechanism including a mandrel for winding said tapes into a capacitor coil, means mounting said mandrel on said frame for coil winding rotation about a longitudinal axis, tape guide means for guiding said tapes from said tape supports to said mandrel, said winding mechanism including a tape gathering pin, means mounting said gatherin pin on said frame for lateral movement in a path adjacent to said mandrel axis, a gathering wheel, means resiliently mounting said wheel for rotation in a plane normal to said gathering pin, said gathering wheel including a plurality of grooves spaced on the periphery thereof, said grooves extending into said path of said gathering pin whereby said tapes may be clamped into said grooves by said gathering pin, means for moving said gathering pin in said path thereof to feed said clamped tapes into contact with said mandrel, said winding mechanism including means for holding said tapes to said mandrel, and means to rotate said mandrel to wind said tapes into a capacitor coil.

19. A machine for winding capacitor coils from foil and dielectric tapes, a frame, a plurality of tape supports mounted on said frame, a winding mechanism including a mandrel having a plurality of separable sections for winding said tapes into a capacitor coil, means mounting said mandrel sections on said frame for coil winding rotation about a common longitudinal axis, tape guide means for guiding said tapes from said tape supports to said mandrel, said winding mechanism including a tape gathering pin, means mounting said gathering pin on said frame for lateral movement in a circular path about said common mandrel axis, a gathering wheel, means mounting said wheel for rotation in a plane normal to said gathering pin, said gathering wheel mounting means including a resilient device normally urging said gathering wheel toward said gathering pin, said gathering wheel including a plurality of grooves spaced on the periphery thereof, said grooves extending into said circular path of said gathering pin whereby said tapes may be clamped into said grooves by said gathering pin, means for moving said gathering pin in said circular path to feed said clamped tapes into contact with one of said mandrel sections, means to move another one of said mandrel sections into contact with said one mandrel section to hold said tapes therebetween, and means to rotate said mandrel sections to wind said tapes into a capacitor coil.

20. A machine for winding capacitor coils from foil and dielectric tapes, a frame, a plurality of tape supports mounted on said frame, a winding mechanism including a mandrel having a plurality of sections for winding said tapes into a capacitor coil, means mounting said mandrel on said frame for coil winding rotation about its longitudinal axis, tape guide means for guiding said tapes from said tape supports to said mandrel, said winding mechanism including a tape gathering pin, means mounting said gathering pin on said frame for lateral movement in a path adjacent to said mandrel axis, a gathering wheel rotatably mounted on said frame and including a plurality of grooves spaced on the periphery thereof, said grooves extending into said path of said gathering pin whereby said tapes may be clamped into said grooves by said gathering pin, means for moving said gathering pin in said path to feed said clamped tapes into contact with one of said mandrel sections, means to move another one of said mandrel sections into contact with said one mandrel section to hold said tapes therebetween, and means to simultaneously rotate said mandrel sections to wind said tapes into a capacitor coil.

21. A machine for winding capacitor coils from foil and dielectric tapes, a frame, a plurality of tape supports mounted on said frame, a winding mechanism for winding said tapes into a capacitor coil, tape guide means for guiding said tapes along paths from said tape supports to said winding mechanism, said winding mechanism including a tape gathering pin extending transversely to said tape paths, means mounting said gathering pin on said frame for lateral movement in a path and for rotation about its longitudinal axis, a gathering wheel rotatably mounted on said frame and including a plurality of grooves spaced on the periphery thereof, said grooves extending into said path of said gathering pin whereby said tapes may be clamped into said grooves by said gathering pin.

22. In an automatic machine for making capacitor coils from alternate layers of foil tape and dielectric tape, a machine frame, a plurality of spool supports for holding the tape mounted on said frame, a source of power, winding mechanism including a rotating mandrel structure driven from said power source, means for securing the tapes to said mandrel and for rotating said mandrel to form the capacitor coil thereabout, retractable means controlled by the rotation of said mandrel for severing the foil, and additional means for simultaneously severing the tape and sealing the same directly to said capacitor coil after the foil has been severed, a gathering means for collecting the tapes and for associating the tapes with said mandrel structure, said gathering means including a gathering pin rotatable about said mandrel and a threading wheel associated therewith, and additional power means for driving said gathering means.

References Cited in the file of this patent

UNITED STATES PATENTS

| | | |
|---|---|---|
| 1,963,381 | Purdy | June 19, 1934 |
| 1,981,133 | Waters | Nov. 20, 1934 |
| 2,040,323 | McCain | May 12, 1936 |
| 2,199,603 | Ackley | May 7, 1940 |
| 2,384,983 | Weiss | Sept. 18, 1945 |
| 2,644,645 | Bevevino | July 7, 1953 |
| 2,668,023 | Whitson et al. | Feb. 2, 1954 |
| 2,681,771 | Haskell | June 22, 1954 |
| 2,841,342 | Goodall | July 1, 1958 |